United States Patent
Suga et al.

(10) Patent No.: US 7,957,835 B2
(45) Date of Patent: Jun. 7, 2011

(54) LEGGED ROBOT AND CONTROL METHOD THEREOF

(75) Inventors: Keisuke Suga, Toyota (JP); Ryosuke Tajima, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 977 days.

(21) Appl. No.: 11/794,496

(22) PCT Filed: Feb. 3, 2006

(86) PCT No.: PCT/JP2006/302298
§ 371 (c)(1),
(2), (4) Date: Jun. 29, 2007

(87) PCT Pub. No.: WO2006/083028
PCT Pub. Date: Aug. 10, 2006

(65) Prior Publication Data
US 2009/0187275 A1 Jul. 23, 2009

(30) Foreign Application Priority Data
Feb. 3, 2005 (JP) .............................. 2005-028036

(51) Int. Cl.
*G06F 19/00* (2006.01)
(52) U.S. Cl. ............... 700/245; 318/568.12; 318/568.17
(58) Field of Classification Search .................. 700/245, 700/258; 901/1; 318/15, 490, 568.1, 568.11, 318/568.12, 568.17
See application file for complete search history.

(56) References Cited

U.S. PATENT DOCUMENTS
5,432,417 A 7/1995 Takenaka et al.
(Continued)

FOREIGN PATENT DOCUMENTS
EP 1 466 705 A1 10/2004
(Continued)

OTHER PUBLICATIONS
K. Nishiwaki et al., "Fast Generation Method of Dynamically Stable Trajectory of Humnoid Motion based on the Characteristics of ZMP," Pamphlet of 18th Annual Conference of Robotics Society of Japan, Sep. 12, 2000, pp. 721-722 (3 pages).
(Continued)

*Primary Examiner* — Khoi Tran
*Assistant Examiner* — Jaime Figueroa
(74) *Attorney, Agent, or Firm* — Finnegan, Henderson, Farabow, Garrett & Dunner, LLP

(57) ABSTRACT

Technology is provided that can compute a center of gravity pathway for a robot in which the ZMP matches the target ZMP, even if the robot is caused to perform a crouching movement during a single leg ground phase. The robot of the present invention is a legged robot that moves the center of gravity in the vertical direction when one leg link is grounded by changing joint angles, and comprises means for generating the vertical pathway of the center of gravity, means for computing the horizontal pathway of the center of gravity, based upon the generated vertical pathway of the center of gravity, a tridiagonal equation which is a discretization of a ZMP equation, a target ZMP, and horizontal speeds of the center of gravity at the beginning and the completion of the vertical pathway, means for computing chronological data of target values of the joint angles, based upon the generated vertical pathway and the computed horizontal pathway of the center of gravity, and means for rotating the joints based upon the computed chronological data of the target values of the joint angles.

8 Claims, 6 Drawing Sheets

U.S. PATENT DOCUMENTS

| | | | |
|---|---|---|---|
| 6,505,096 B2 * | 1/2003 | Takenaka et al. | 700/245 |
| 6,697,709 B2 * | 2/2004 | Kuroki et al. | 700/245 |
| 6,865,446 B2 * | 3/2005 | Yokono et al. | 700/245 |
| 6,876,903 B2 | 4/2005 | Takenaka | |
| 6,898,485 B2 * | 5/2005 | Kuroki et al. | 700/245 |
| 7,112,938 B2 * | 9/2006 | Takenaka et al. | 318/568.12 |
| 7,308,335 B2 | 12/2007 | Takenaka et al. | |
| 7,400,939 B2 | 7/2008 | Nagasaka | |
| 7,698,020 B2 * | 4/2010 | Kawai et al. | 700/245 |
| 2002/0022907 A1 * | 2/2002 | Takenaka et al. | 700/245 |
| 2004/0176875 A1 * | 9/2004 | Iribe et al. | 700/245 |
| 2004/0211603 A1 * | 10/2004 | Furuta et al. | 180/8.1 |
| 2005/0038560 A1 | 2/2005 | Nagasaka | |
| 2005/0107916 A1 | 5/2005 | Nagasaka | |
| 2005/0228540 A1 * | 10/2005 | Moridaira | 700/245 |
| 2005/0267630 A1 | 12/2005 | Kajita et al. | |
| 2008/0133057 A1 | 6/2008 | Hasegawa | |

FOREIGN PATENT DOCUMENTS

| | | |
|---|---|---|
| EP | 1 559 519 A1 | 8/2005 |
| JP | 5-305585 | 11/1993 |
| JP | 2004-114243 | 4/2004 |
| JP | 2004-142095 | 5/2004 |
| JP | 2004-167676 | 6/2004 |
| JP | 3599244 | 12/2004 |
| JP | 2005-007496 | 1/2005 |
| JP | 2006-175567 | 7/2006 |
| JP | 2006-247769 | 9/2006 |
| WO | WO 02/40224 | 5/2002 |
| WO | WO 03/057426 | 7/2003 |
| WO | WO 2006/083028 | 8/2006 |
| WO | WO 2008/010485 | 1/2008 |

OTHER PUBLICATIONS

Y. Minemura, "Learning with C and Java, A Guide to Numerical Simulation," Morikita Publishing Company, Apr. 30, 1999, 1st edition, pp. 61-64, and 178-180 (8 pages).

Notification of Reasons for Rejection for JP 2006-195717 dated Jun. 1, 2010.

Copending U.S. Appl. No. 12/087,473, entered national stage on Jul. 8, 2008, named inventor: Ryosuke Tajima, named Assignee: Toyota Jidosha Kabushiki Kaisha.

Tajima et al., "Motion having a Flight Phase: Experiments Involving a One-legged Robot." Proceedings of the 2006 IEEE International Conference on Intelligent Robots and Systems, Oct. 9-15, 2006, Beijing, China.

Tajima et al., "Motion having a Flight Phase: Experiments Involving a One-legged Robot." The 24$^{th}$ annual Conference of the Robotics Society of Japan, Sep. 14-16, 2006.

* cited by examiner

LEGGED ROBOT AND CONTROL METHOD THEREOF

CROSS-REFERENCE TO RELATED APPLICATION

The present application claims priority based on Japanese Patent Application No. 2005-028036, filed on Feb. 3, 2005, the entire contents of which are incorporated by reference into this application.

TECHNICAL FIELD

The present invention relates to a legged robot and a method of controlling the movement thereof.

BACKGROUND ART

Robots are being developed which comprise at least one leg link, which move by repeating movements to swing the leg link forward in the direction in which the robot attempts to move, and to make the leg link that has been swung forward and grounded become the support leg. It is known that legged robots like these can achieve a stable walking movement by controlling them based on the ZMP (Zero Moment Point). ZMP means the point on the floor at which the sum of the moments caused by external forces (including inertia) applied to the robot is equal to zero. Even in a state in which only one leg link is grounded, the robot will not fall if the ZMP is inside the foot plane of the support leg. For example, in the case of a robot that comprises two leg links, the robot will move by making one leg link the support leg, making the other leg link the idle leg, and swinging the idle leg link forward. If, during this one leg grounded state, the ZMP is inside the foot plane of the support leg, the robot will not fall. If, during the time in which the leg link that was the idle leg is grounded and both leg links are grounded, the ZMP shifts from inside the foot plane of the leg link that was the support leg up until that point to inside the foot plane of the leg link that was newly grounded, the robot will not fall, and it will be possible for the robot to swing the leg link that was the support leg up until that point forward. When the robot swings the leg link (which was the support leg up until that point) forward, the robot will not fall if the ZMP is inside the foot plane of the new support leg. By repeating the aforementioned movements, the robot will not fall and can continue to walk.

Humans perform a variety of movements in addition to walking. It is desirable for a robot to be able to run, jump, and hop while maintaining balance. All of these types of movements are comprised of an aerial phase (a phase in which the robot is floating in mid-air). Only gravity is applied to the robot in the aerial phase, and the ZMP cannot be defined. Technology is needed that will stabilize the robot before and after the aerial phase.

Technology is being developed in order to achieve movements of legged robots that include an aerial phase. For example, Japanese Laid-Open Patent Application Publication 2004-142095 discloses technology which calculates the center of gravity pathway in which the ZMP calculated with a ZMP equation (an equation which calculates the ZMP from the posture of the robot and the chronological changes therein) matches a target ZMP, for the ground phase (the phase in which the robot is grounded on the floor) before and after the aerial phase. This technology will divide the movement of the robot into a plurality of time intervals. For a phase in which one of the leg links is grounded and is the support leg (e.g. the grounded phase) in the divided time intervals, an analytic solution of the center of gravity pathway is prepared in advance. The analytic solution has been calculated based on the assumption that (1) the ZMP pathway has no acceleration, (2) the height of the center of gravity is fixed, and (3) the outer moment is fixed. The center of gravity pathway is then calculated by applying a coefficient of that analytic solution in real time. Note that the word "pathway" in the present specification refers to data that describes the changes in position over time.

In addition, Japanese Laid-Open Patent Application Publication 2004-167676 also discloses technology that calculates the center of gravity pathway in which the ZMP calculated with a ZMP equation matches a target ZMP. With this technology as well, an analytic solution of the center of gravity pathway is prepared in advance. The analytic solution has been derived based upon the assumption that (1) the ZMP pathway has no acceleration, (2) the height of the center of gravity is fixed, and (3) the outer moment is fixed. The parameters of that analytic solution are applied in real time. In addition, the aforementioned analytic solution will be adjusted near the boundary between the non-grounded state and the grounded state in order to maintain the continuity of the center of gravity pathway.

DISCLOSURE OF INVENTION

In the technology disclosed in Japanese Laid-Open Patent Application Publication 2004-142095 and Japanese Laid-Open Patent Application Publication 2004-167676, the height of the robot's center of gravity is assumed to be substantially fixed when the horizontal center of gravity pathway in the ground phase is generated. In fact, if the condition that the height of the robot's center of gravity is substantially fixed is added, it will be possible to condense the computational effort needed to compute a center of gravity pathway in which the ZMP calculated with a ZMP equation matches the target ZMP. In addition, the height of the robot's center of gravity may be substantially fixed during normal walking. For normal walking, the center of gravity pathway can be computed with little computational effort and high reliability by means of the technology in Japanese Laid-Open Patent Application Publication 2004-142095 and Japanese Laid-Open Patent Application Publication 2004-167676.

However, problems remain because the technology disclosed in Japanese Laid-Open Patent Application Publication 2004-142095 and Japanese Laid-Open Patent Application Publication 2004-167676 is for computing the center of gravity pathway in the ground phase before and after the aerial phase. The movement of the robot in the aerial phase largely depends upon the movement of the robot at the point at which it switches from the ground phase to the aerial phase (at the point the robot takes off). For example, when considering a situation in which the robot will jump, the height that the robot can achieve will be determined by the speed of the robot in the vertical direction when the robot takes off. In order to make the robot jump higher, the speed of the center of gravity in the vertical direction must be increased at the point the robot leaves the ground. In order to increase the speed of the center of gravity in the vertical direction at the point the robot leaves the ground, the robot must take a crouching posture prior to jumping, and then jump up therefrom. Therefore, in order to jump higher, the robot must crouch down prior to jumping, and then jump up therefrom. Referring the time period up to the point at which the robot leaves the ground as the prior ground phase, in order for the robot to jump higher, the position of the center of gravity in the vertical direction must move vertically in the prior ground phase.

In addition, the higher the robot jumps, the faster the speed of the center of gravity in the vertical direction will be at the point at which the robot changes from the aerial phase to the ground phase (the point at which the robot lands back on the ground). If the height of the center of gravity in the ground phase after landing back on the ground is substantially fixed, then a large reaction force will be applied from the floor in order to negate momentum of the robot in the vertical direction, the movement of the robot will become unstable, and the robot may tip over. In order to stabilize the posture of the robot after it lands back on the ground, it will be necessary to crouch down after landing to thereby gently reduce the momentum of the robot in the vertical direction. Referring the time period after landing is the posterior ground phase, the robot must vertically move the position of its center of gravity in the vertical direction in the posterior ground phase in order for the robot to stably land.

As noted above, the position of the center of gravity in the vertical direction must move vertically in the prior ground phase before leaving the ground, or in the posterior ground phase after landing. Nonetheless, in the technology disclosed in Japanese Laid-Open Patent Application Publication 2004-142095 and Japanese Laid-Open Patent Application Publication 2004-167676, the center of gravity pathway will be calculated so that the height of the center of gravity will not change in the prior ground phase and the posterior ground phase. With the technology disclosed in Japanese Laid-Open Patent Application Publication 2004-142095 and Japanese Laid-Open Patent Application Publication 2004-167676, there is a possibility that the ZMP will deviate from the target ZMP, and that the robot will tip over, when the robot is caused to perform a crouching movement in order to jump higher, or when the robot is caused to perform a crouching movement after landing in order to lessen the impact of landing.

The aforementioned problem is solved in the present invention. An object of the present invention is to provide technology that can compute a center of gravity pathway in which the ZMP matches the target ZMP, even if the robot is caused to perform a crouching movement during a single leg ground phase. The technology of the present invention is effective even when the robot is caused to perform a crouching movement in order to jump high, or when the robot is caused to perform a crouching movement after landing in order to lessen the impact of landing. Of course, the present invention can also calculate the center of gravity pathway from the ground phase preceding a jump to the ground phase after the jump.

The present invention achieves a legged robot that achieves "crouching, taking off, floating, landing, and crouching" movements by changing joint angles thereof. Hereinafter, a period from the beginning of the crouching to the taking off is a prior ground phase, a period during the floating is an aerial phase, a period from the landing to the completion of the crouching is a posterior ground phase, a change in the height of a center of gravity with respect to time is a vertical pathway, and a change in the horizontal position of the center of gravity with respect to time is a horizontal pathway. In order to achieve the "crouching, taking off, and floating" movements, the aforementioned robot comprises means for generating the vertical pathway of the prior ground phase, means for computing the horizontal pathway of the prior ground phase, and means for computing chronological data of the target values of the joint angles of the prior ground phase based upon the generated vertical pathway and the computed horizontal pathway of the prior ground phase. The means for computing the horizontal pathway of the prior ground phase will compute the horizontal pathway of the prior ground phase, based upon the generated vertical pathway of the prior ground phase, a tridiagonal equation which is a discretization of a ZMP equation of the prior ground phase, a target ZMP of the prior ground phase, and horizontal speeds of the center of gravity at the beginning and the completion of the prior ground phase. In addition, in order to achieve the "landing and crouching" movements, the aforementioned robot comprises means for generating the vertical pathway of the posterior ground phase, means for computing the horizontal pathway of the posterior ground phase, and means for computing chronological data of the target values of the joint angles of the posterior ground phase based upon the generated vertical pathway and the computed horizontal pathway of the posterior ground phase. The means for computing the horizontal pathway of the posterior ground phase will compute the horizontal pathway of the posterior ground phase, based upon the generated vertical pathway of the posterior ground phase, a tridiagonal equation which is a discretization of a ZMP equation of the posterior ground phase, a target ZMP of the posterior ground phase, and horizontal speeds of the center of gravity at the beginning and the completion of the posterior ground phase. In addition, the aforementioned robot comprises means for rotating the joints, based upon the computed chronological data of the target values of the joint angles.

The legged robot of the present invention comprises means for generating the vertical pathway of the prior ground phase, and can provide vertical motion that achieves a movement in which the robot crouches and then takes off. The legged robot of the present invention computes a horizontal pathway in consideration of the vertical pathway, in which the ZMP matches the target ZMP. If the vertical pathway is provided and the horizontal pathway is assumed, a chronological change in the robot's posture can be provided, the inertial force can be computed, and the ZMP can be computed. By applying this relationship, a horizontal pathway in which the ZMP computed from the aforementioned relationship matches the target ZMP, can be mathematically computed. To compute the ZMP from the vertical pathway and the horizontal pathway, the vertical acceleration and speed, and the horizontal acceleration and speed, are needed. When the vertical pathway and the horizontal pathway are discretized by time intervals, the speed can be computed from two position coordinates at the beginning and the completion of a time period. The acceleration can be computed from three position coordinates at the beginning, intermediate point, and the completion of two continuous time periods. For example, assuming that discrete points of time with unit time $\Delta t$ as $t1, t2, t3 \ldots$, the speed at the point of time $t3$ can be computed from two position coordinates at the points of time $t2$ and $t3$. The acceleration at the point of time $t3$ can be computed from three position coordinates at the points of time $t1, t2,$ and $t3$. Of course, the aforementioned is an example, and the speed at the point of time $t2$ may be computed from two position coordinates at the points of time $t2$ and $t3$, and the acceleration at the point of time $t2$ may be computed from three position coordinates at the points of time $t1, t2,$ and $t3$. An important point is that the ZMP can be computed from three position coordinates. Using the previous example, the ZMP at the point of time $t3$ can be computed from three position coordinates at the points of time $t1, t2,$ and $t3$. Or, in some criteria, the ZMP at the point of time $t2$ can be computed from three position coordinates at the points of time $t1, t2,$ and $t3$, or the ZMP at the point of time $t1$ can be computed from three position coordinates at the points of time $t1, t2,$ and $t3$. An important point is that the ZMP can be computed from position coordinates at three points of time. In the present specification, "a tridiagonal equation which is a discretization of a ZMP equation" means an equation that computes the ZMP from position coordinates at three discrete points of time. When this tridiagonal equation is used, a horizontal pathway in which the ZMP computed from the aforementioned relationship matches the target ZMP can be computed. The horizontal position of the center of gravity at each discrete points of time can be computed.

The robot of the present invention comprises means for computing the horizontal pathway in consideration of the vertical pathway. If vertical motion that achieves a movement in which the robot crouches and then takes off is provided, a center of gravity pathway that is premised on that vertical motion will be computed. The ZMP can be prevented from deviating from the target ZMP and the robot can be prevented from tipping over, when a movement is achieved in which the robot crouches and then takes off. Boundary parameters are needed in order to compute a horizontal pathway in which the ZMP matches the target ZMP. In the present invention, the boundary parameters are the horizontal speeds of the center of gravity at the beginning (the beginning of the crouching) and the completion (the point of the takeoff) of the prior ground phase. The horizontal pathway that will satisfy the boundary parameters will be computed, and the horizontal pathway having the appropriate position and speed can be computed.

A similar explanation will also be applied to when a crouching movement is achieved in order to lessen the impact of landing. The present invention can provide vertical motion that achieves a crouching movement that is performed after landing in order to lessen the impact of landing. The legged robot of the present invention computes a horizontal pathway in consideration of the vertical pathway, in which the ZMP matches the target ZMP. Here as well, the aforementioned tridiagonal equation can be used, and if the motion in the vertical direction that achieves the crouching movement after landing is provided, the center of gravity pathway premised on that vertical motion can be computed. The ZMP can be prevented from deviating from the target ZMP and the robot can be prevented from tipping over, when a crouching movement after landing is achieved. In this situation as well, boundary parameters are needed in order to compute the horizontal pathway. In the present invention, the boundary parameters are the horizontal speeds of the center of gravity at the beginning (the point of the landing) and the completion (the completion of the crouching movement) of the posterior ground phase. The horizontal pathway that will satisfy the boundary parameters will be computed, and the horizontal pathway having the appropriate position and speed can be computed.

According to the robot of the present invention, the height of the center of gravity can be moved vertically to achieve the "crouching, taking off, floating, landing, and crouching" movements. In the prior ground phase and the posterior ground phase, in which it is possible for the robot to tip over, a horizontal pathway in which the ZMP matches the target ZMP while the height of the center of gravity is moved vertically to achieve a crouching movement is computed. Thus, the robot can be prevented from tipping over when the robot moves the center of gravity vertically to achieve the crouching movement.

As noted above, when the "tridiagonal equation which is a discretization of a ZMP equation" is used, a horizontal pathway that achieves a ZMP which matches the target ZMP can be computed. In this situation, each one of the means for computing the horizontal pathway of the prior ground phase and the posterior ground phase comprises preferably comprises means for solving simultaneous equations formed between a tridiagonal matrix having coefficients that are computed from the vertical pathway, and a horizontal pathway column and a distance column that is computed from the target ZMP and the horizontal speeds of the center of gravity at the beginning and the completion of the ground phase, to compute the horizontal pathway. Technology is being developed that will solve simultaneous equations that are expressed with a tridiagonal matrix at high speed and with little computational load. Therefore, in order to compute the horizontal pathway of the center of gravity of the legged robot, simultaneous equations that are expressed with a tridiagonal matrix are generated, and the simultaneous equations are solved so as to compute the horizontal pathway of the center of gravity, and thus the horizontal pathway can be computed at high speed and with little computational load.

Preferably, the each one of the means for generating the vertical pathway of the prior ground phase and the posterior ground phase polynomially interpolates between the vertical positions and speeds of the center of gravity at the beginning and the completion of the ground phase to generate the vertical pathway. In the prior ground phase, when the vertical position and speed of the center of gravity at the beginning (the beginning of the crouching) and the completion (the point of the takeoff) are provided, and polynomial interpolation is used to generate the vertical position and speed of the center of gravity therebetween, the vertical pathway of the center of gravity will be made smooth. Because of the smoothly transition of the vertical pathway of the center of gravity, the legged robot can achieve stable movement. In addition, because the vertical speed at the point of the takeoff is provided, the jump height of the robot can be provided. A jumping movement of a desired height can be easily achieved. In the posterior ground phase, when the vertical position and speed of the center of gravity at the beginning (the point of the landing) and the completion (the completion of the crouching movement) are provided, and polynomial interpolation is used to generate the vertical position and speed of the center of gravity therebetween, the vertical pathway of the center of gravity will be made smooth. Because of the smoothly transition of the vertical pathway of the center of gravity, the legged robot can achieve stable movement.

The present invention is effective for movements in which the robot jumps upward from a crouch, or movements in which the robot crouches after landing. In a movement in which the robot jumps upward from a crouch, or a movement in which the robot crouches after landing, a movement can be achieved which changes the height of the center of gravity of the legged robot while one leg link is grounded. In order to achieve this movement, means for generating a vertical pathway of the center of gravity, means for computing a horizontal pathway of the center of gravity, means for computing chronological data of the target values of the joint angles based upon the generated vertical pathway of the center of gravity and the computed horizontal pathway of the center of gravity, and means for rotating the joints based upon the computed chronological data of the target values of the joint angles, will be used. The means for computing the horizontal pathway of the center of gravity will compute the horizontal pathway of the center of gravity, based upon the generated vertical pathway of the center of gravity, a tridiagonal equation which is a discretization of a ZMP equation, the target ZMP, and horizontal speeds of the center of gravity at the beginning and the completion of the vertical pathway. During a movement in which the robot crouches before the takeoff, or during a movement in which the robot crouches down after landing, the robot will compute the horizontal pathway of the center of gravity that achieves a ZMP that matches the target ZMP, and the robot will achieve the computed pathway.

The present invention is also embodied as a method. In order to cause a legged robot to achieve "crouching, taking off, floating, landing, and crouching" movements by changing the joint angles thereof, the method performs a step of generating a vertical pathway of a prior ground phase, a step of computing a horizontal pathway of the prior ground phase in consideration of the vertical pathway of the prior ground phase, a step of computing chronological data of the target values of the joint angles of the prior ground phase based upon the generated vertical pathway and the computed horizontal pathway of the prior ground phase, a step of generating a vertical pathway of a posterior ground phase, a step of computing a horizontal pathway of the posterior ground phase in consideration of the vertical pathway of the posterior ground phase, a step of computing chronological data of the target values of the joint angles of the posterior ground phase based upon the generated vertical pathway and the computed horizontal pathway of the posterior ground phase, and a step of rotating the joints based upon the computed chronological data of the target values of the joint angles. In the step of computing the horizontal pathway of the prior ground phase, the horizontal pathway of the prior ground phase will be computed based upon the generated vertical pathway of the prior ground phase, a tridiagonal equation which is a discretization of a ZMP equation of the prior ground phase, the target ZMP of the prior ground phase, and horizontal speeds of the center of gravity at the beginning and the completion of the prior ground phase. Likewise, in the step of computing the horizontal pathway of the posterior ground phase, the horizontal pathway of the posterior ground phase will be computed based upon the generated vertical pathway of the posterior ground phase, a tridiagonal equation which is a discretization of a ZMP equation of the posterior ground phase, the target ZMP of the posterior ground phase, and horizontal speeds of the center of gravity at the beginning and the completion of the posterior ground phase. According to the aforementioned method, a pathway that changes the height of the center of gravity of the legged robot with respect to time, and that causes the "crouching, taking off, floating, landing, and crouching" movements to be performed, can be computed with little computational effort. A horizontal pathway of the center of gravity can be computed that achieves a ZMP that matches the target ZMP during the movement of the robot in real time.

As noted above, when the "tridiagonal equation which is a discretization of a ZMP equation" is used, a horizontal pathway that achieves a ZMP which matches the target ZMP can be computed. In this situation, each one of the steps of computing the horizontal pathway of the prior ground phase and the posterior ground phase preferably comprises a step of solving simultaneous equations formed between a tridiagonal matrix having coefficients that are computed from the vertical pathway, and a horizontal pathway column and a distance column that is computed from the target ZMP and the horizontal speeds of the center of gravity at the beginning and the completion of the ground phase, to compute the horizontal pathway. Technology is being developed that will solve simultaneous equations that are expressed with a tridiagonal matrix at high speed and with little computational load. Therefore, in order to compute the horizontal pathway of the center of gravity of the legged robot, simultaneous equations that are expressed with a tridiagonal matrix are generated, and the simultaneous equations are solved so as to compute the horizontal pathway of the center of gravity, and thus the horizontal pathway can be computed at high speed and with little computational load.

Preferably, each one of the steps of generating the vertical pathway of the prior ground phase and the posterior ground phase will polynomially interpolates between the vertical positions and speeds of the center of gravity at the beginning and the completion of the ground phase to generate the vertical pathway. In the prior ground phase, when the vertical positions and speeds of the center of gravity at the beginning (the beginning of the crouching) and the completion (the point of the takeoff) are provided, and polynomial interpolation is used to generate the vertical position and speed of the center of gravity therebetween, the vertical pathway of the center of gravity will be made smooth. Because of the smoothly transition of the vertical pathway of the center of gravity, the legged robot can achieve stable movement. In addition, because the vertical speed at the point of the takeoff is provided, the jump height of the robot can be provided. A jumping movement of a desired height can be easily achieved. In the posterior ground phase, when the vertical positions and speeds of the center of gravity at the beginning (the point of the landing) and the completion (the completion of the crouching movement) are provided, and polynomial interpolation is used to generate the vertical position and speed of the center of gravity therebetween, the vertical pathway of the center of gravity will be made smooth. Because of the smoothly transition of the vertical pathway of the center of gravity, the legged robot can achieve stable movement.

In a movement in which the robot jumps upward from a crouch, or a movement in which the robot crouches after landing, it will be necessary to perform a movement that changes the center of gravity in the vertical direction while one leg link of the legged robot is grounded. The present invention provides a method of computing the horizontal pathway of the center of gravity that achieves a ZMP that matches the target ZMP, either during a movement in which the robot jumps upward from a crouch, or a movement in which the robot crouches down after landing. The method of the present invention comprises a step of generating a vertical pathway of the center of gravity, a step of computing a horizontal pathway of the center of gravity in consideration of the vertical pathway, a step of computing chronological data of the target values of the joint angles based upon the generated vertical pathway of the center of gravity and the computed horizontal pathway of the center of gravity, and a step of rotating the joints based upon the computed chronological data of the target values of the joint angles, will be used. In the step of computing the horizontal pathway of the center of gravity, the horizontal pathway of the center of gravity will be computed based upon the generated vertical pathway of the center of gravity, a tridiagonal equation which is a discretization of a ZMP equation, a target ZMP, and horizontal speeds of the center of gravity at the beginning and the completion of the vertical pathway. According to the present method, the robot can compute the horizontal pathway of the center of gravity that achieves a ZMP that matches the target ZMP with little computational effort, either in a movement in which the robot jumps upward from a crouch, or a movement in which the robot crouches down after landing.

By employing the technology of the present invention, a horizontal pathway of the center of gravity that achieves a ZMP that matches a target ZMP can be computed for a movement in which the robot jumps upward from a crouch, a movement in which the robot crouches down after landing, or a series of "crouching, taking off, floating, landing, and crouching" movements. A stable robot posture can be achieved, even during times in which a change in the height of the center of gravity will usually cause the robot to lose stability.

BRIEF DESCRIPTION OF DRAWINGS

The present invention may be more clearly understood by referring to the drawings below. The components of the drawings are not necessarily drawn in a fixed scale, but rather emphasis is employed in order to clearly describe the fundamental aspects of the present invention. In the drawings, like reference numerals denote like portions in different drawings.

BEST MODE FOR CARRYING OUT THE INVENTION

The primary features of the embodiment described below are as follows.
(Feature 1) A legged robot that achieves "crouching, taking off, floating, landing, and crouching" movements by changing joint angles, wherein a period from the beginning of the crouching to the taking off is an prior ground phase, a period during the floating is an aerial phase, a period from the landing to the completion of the crouching is a posterior ground phase, a change in the height of a center of gravity with respect to time is a vertical pathway, and a change in a horizontal position of the center of gravity with respect to time is a horizontal pathway, the legged robot comprising:

means for generating the vertical pathway of the prior ground phase, means for computing the horizontal pathway of the prior ground phase, based upon the generated vertical pathway of the prior ground phase, a tridiagonal equation which is a discretization of a ZMP equation of the prior ground phase, a target ZMP of the prior ground phase, and horizontal speeds of the center of gravity at the beginning and the completion of the prior ground phase, means for computing chronological data of target values of the joint angles of the prior ground phase based upon the generated vertical pathway and the computed horizontal pathway of the prior ground phase, means for generating a vertical pathway of the posterior ground phase, means for computing a horizontal pathway of the posterior ground phase, based upon the generated vertical pathway of the posterior ground phase, a tridiagonal equation which is a discretization of a ZMP equation of the posterior ground phase, a target ZMP of the posterior ground phase, and horizontal speeds of the center of gravity at the beginning and the completion of the posterior ground phase, means for computing chronological data of target values of the joint angles of the posterior ground phase, based upon the generated vertical pathway and the computed horizontal pathway of the posterior ground phase, means for computing chronological data that describes the posture during the aerial phase, based upon the generated vertical pathways and the computed horizontal pathways of the prior ground phase and the posterior ground phase, means for computing chronological data of the target values of the joint angles of the aerial phase, based upon the computed chronological data that describes the posture during the aerial phase, and means for rotating the joints based upon the computed chronological data of the target values of the joint angles.

Robot pathway computation technology according to one embodiment of the present invention will be described with reference to the drawings.

Figure 1:
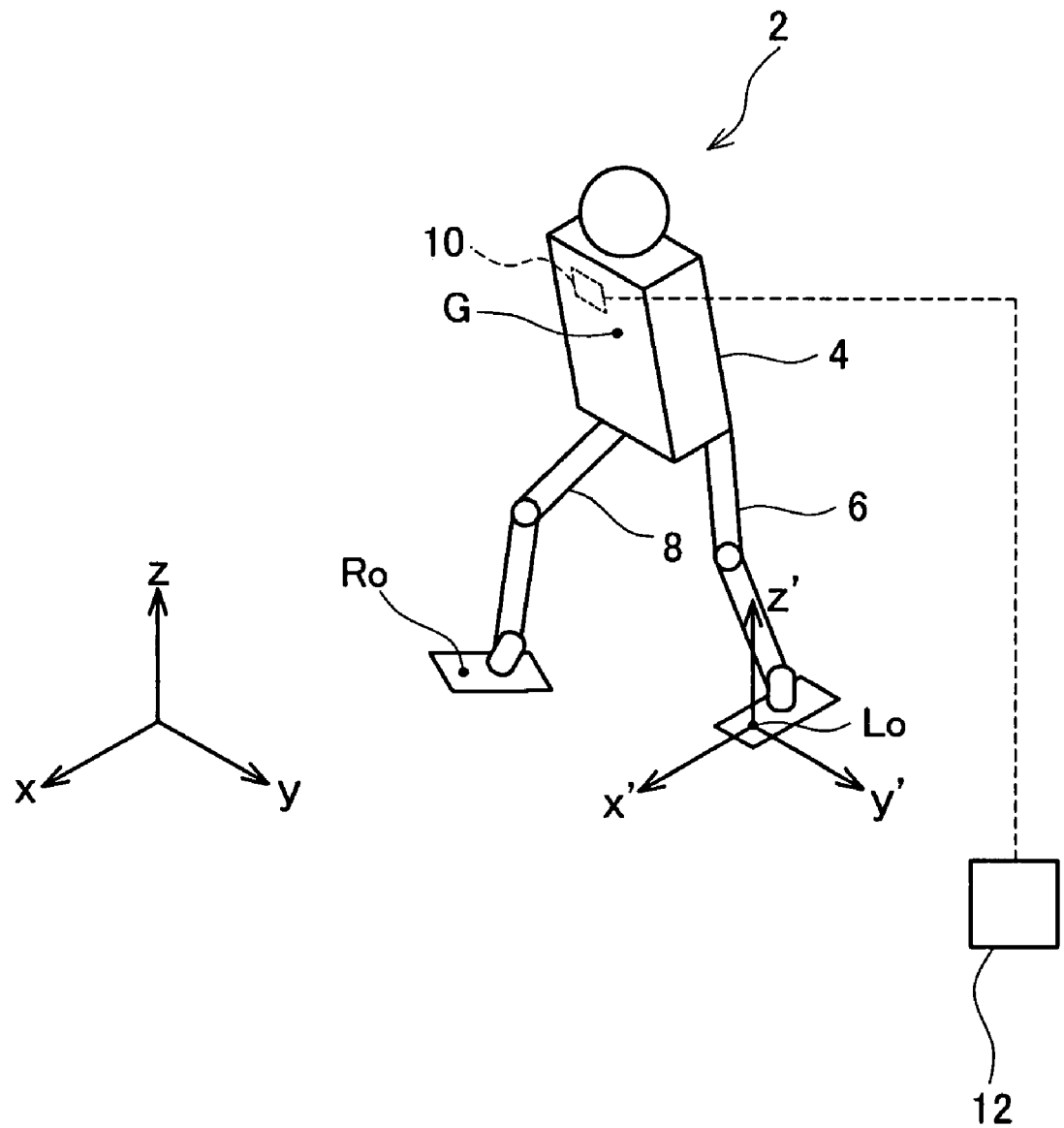
FIG. 1 shows an overview of a robot 2 of the present invention.

FIG. 1 shows an overview of a robot 2 of the present embodiment. The robot 2 comprises a trunk 4, a left leg link 6, a right leg link 8, a control unit 10, and a controller 12. The one end of the left leg link 6 is pivotably connected to the trunk 4 via a hip joint. The left leg link 6 comprises a knee joint and an ankle joint, and comprises a foot plane on the tip thereof. The right leg link 8 is pivotably connected to the trunk 4 via a hip joint. The right leg link 8 comprises a knee joint and an ankle joint, and comprises a foot plane on the tip thereof. Each joint of the robot 2 comprises an actuator (not shown in the drawings), and these actuators rotate the joints in accordance with commands from the control unit 10. Reference points L0, R0 are respectively arranged in the centers of the foot planes of the left leg link 6 and the right leg link 8. The reference points L0, R0 are points that serve as references when a movement pattern of the robot 2 is to be generated. G in the drawings shows the position of the center of gravity of the robot 2.

The control unit 10 is a computer device having a CPU, ROM, RAM, a hard disk, and the like. The control unit 10 is capable of communicating with the controller 12, and will input command values from the controller 12 that a user operates. The control unit 10 will compute or generate movement patterns for the robot 2 based upon the command values input from the user. The control unit 10 stores the generated movement patterns, and rotates each joint so as to achieve the stored movement patterns. Details of the control unit 10 will be described below.

Figure 2:
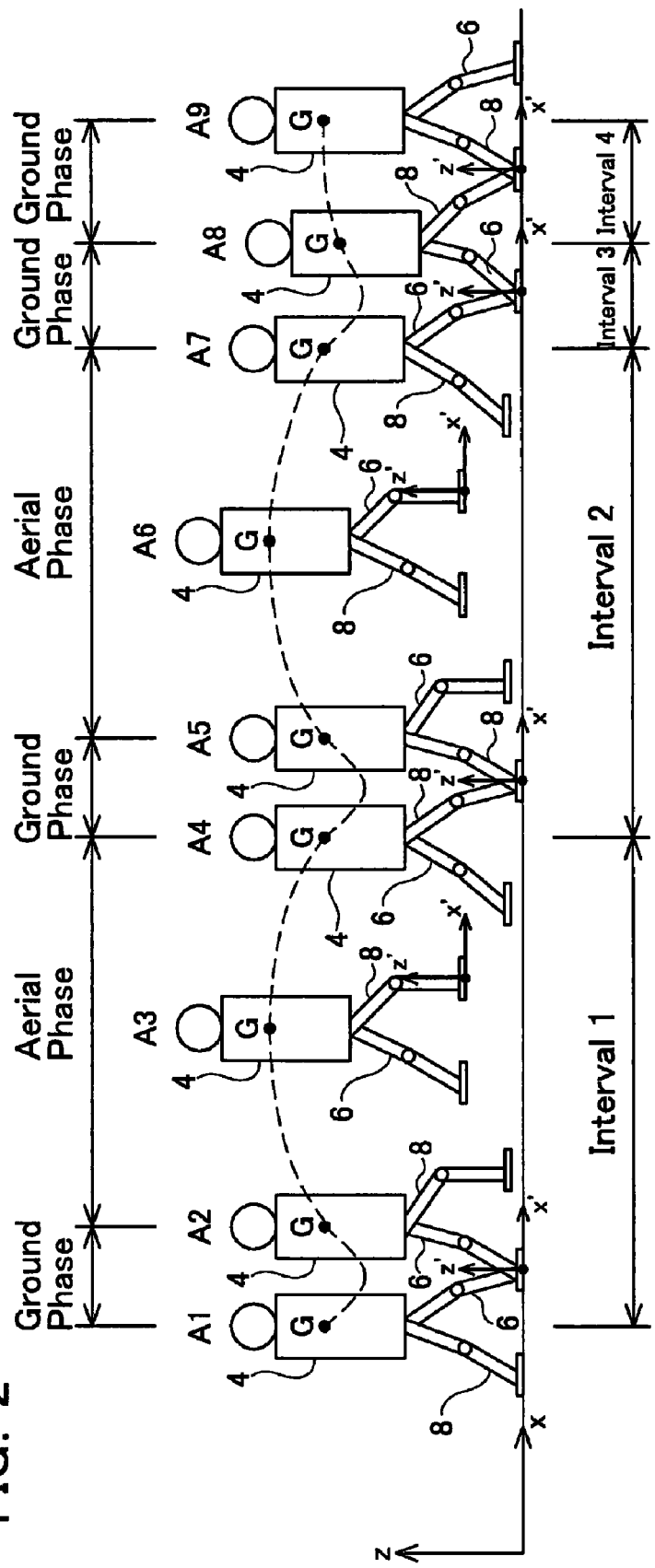
FIG. 2 shows an overview of the movement of the robot 2 of the present invention.

FIG. 2 illustrates an overview of the movement achieved by the robot 2 of the present embodiment. The robot 2 of the present embodiment will move in a ground phase from a posture A1 in which the left leg link 6 is the support leg, and will swing the right leg link 8 forward and shift to a posture A2. The robot 2 will take off in posture A2, and shift to an aerial phase. The robot 2 will pass through posture A3, and will land on the ground in a posture A4 with the right leg link 8. The robot 2 will move in a ground phase from posture A4 in which the right leg link 8 is the support leg, and will swing the left leg link 6 forward and shift to a posture A5. The robot 2 will take off in posture A5, and shift to the aerial phase. The robot 2 will pass through a posture A6, and will land on the ground in a posture A7 with the left leg link 6. The robot 2 will move in a ground phase from posture A7 in which the left leg link 6 is the support leg, and will swing the right leg link 8 forward and shift to a posture A8. The robot 2 will switch the support leg in posture A8 from the left leg link 6 to the right leg link 8, will move in a ground phase from posture A8 in which the right leg link 8 is the support leg, and will swing the left leg link 6 forward and shift to a posture A9.

The broken line in FIG. 2 shows an overview of the center of gravity pathway of the robot 2 during the aforementioned movement. In the ground phase immediately before the robot 2 jumps upward (i.e., the ground phase from posture A1 to posture A2, and the ground phase from posture A4 to posture A5, corresponding to the prior ground phase), the robot 2 will prepare for the jump upward by lowering its center of gravity. In addition, in the ground phase immediately after the robot 2 has landed on the ground (i.e., the ground phase from posture A4 to posture A5, and the ground phase from posture A7 to posture A8, corresponding to the posterior ground phase), the robot 2 will lower its center of gravity in order to lessen the impact of landing caused by the jump.

The aforementioned movement is shown for illustrative purposes only. The robot of the present embodiment can achieve a variety of movements that combine a ground phase and an aerial phase. The movements achieved by the robot can be freely set by a user. For example, the movements may include one in which the robot hops up and down on one leg, or may be movements that do not include an aerial phase, but rather are repeated only in the ground phase. The movements achieved by the robot may constitute a ground phase only, or may mix a ground phase and an aerial phase. The present embodiment is characterized in that the robot is capable of movement in which the center of gravity will move vertically, and will exhibit utility even in situations in which there is vertical movement of the center of gravity without an aerial phase.

With the robot 2 of the present embodiment, the movement to be generated will be divided into several time intervals, and a movement pattern will be generated in each time interval. With the robot 2 of the present embodiment, one time interval in the movement to be generated is assumed to be from the point at which the leg link that will be the support leg is grounded until the point at which the leg link that will be the next support link is grounded. In this case, one time interval constitutes a ground phase and an aerial phase that follows therefrom, or only a ground phase.

In the movement shown in FIG. 2, Interval 1 is assumed to be from the starting point of the initial ground phase (i.e., the point of posture A1, the point at which the crouching movement will begin), until the point at which the aerial phase that follows that ground phase is completed (i.e., the point of posture A4), Interval 2 is assumed to be from the starting point of the ground phase that follows Interval 1 (i.e., the point of posture A4), until the point at which the aerial phase that follows that ground phase is completed (i.e., the point of posture A7), Interval 3 is assumed to be from the starting point of the ground phase that follows Interval 2 (i.e., the point of posture A7) until the point at which that ground phase is completed (i.e., the point of posture A8), and Interval 4 is assumed to be from the starting point of the ground phase that follows Interval 3 (i.e., the point of posture A8) until the point at which that ground phase is completed (i.e., the point of posture A9). There is no aerial phase in Interval 3 and Interval 4, but the center of gravity does move vertically, and thus the technology of the present embodiment will be applied.

A coordinate system (x, y, z) that is fixed to the floor external to the robot 2 will be employed below, as the coordinate system which will describe the pathway of the robot 2. In addition, the pathway of the robot 2 will be described with a coordinate system (x', y', z') that is fixed to a reference point on the robot 2. With the robot 2 of the present embodiment, as shown in FIG. 2, the center of the foot plane of the support leg is assumed to be the reference point of the coordinate system (x', y', z'). In the aerial phase, neither of the leg links are grounded, and neither of the leg links support the robot 2, however for the sake of convenience, the leg link that will be the support leg at the time of landing will be referred to as the support leg in the aerial phase. With the robot 2 of the present embodiment, the center of the foot plane of the support leg is assumed to be the reference point in the aerial phase as in the ground phase. In the aerial phase, the aforementioned reference point will be moved with respect to the floor, as well as the center of gravity of the robot 2. The position, speed, acceleration, and pathway expressed with the coordinate system (x', y', z') that is fixed to the reference point on the robot 2 will be respectively described as the relative position, relative speed, relative acceleration, and relative pathway.

The robot 2 of the present embodiment generates and stores a movement pattern for each time interval, and the stored movement patterns are sequentially read out in order to implement the movements. When a command value is input from a user while the robot 2 is moving, the robot 2 will regenerate the movement patterns to be performed thereafter, and will store the movement patterns in accordance with the newly input command value. The newly stored movement patterns will be reflected in the movements performed thereafter. Thus, the robot 2 of the present invention will generate movement patterns in real time while walking.

By employing the block diagram of FIG. 3 and the flow chart of FIG. 4, details of the operation of the control unit 10 will be described below.

Figure 3:
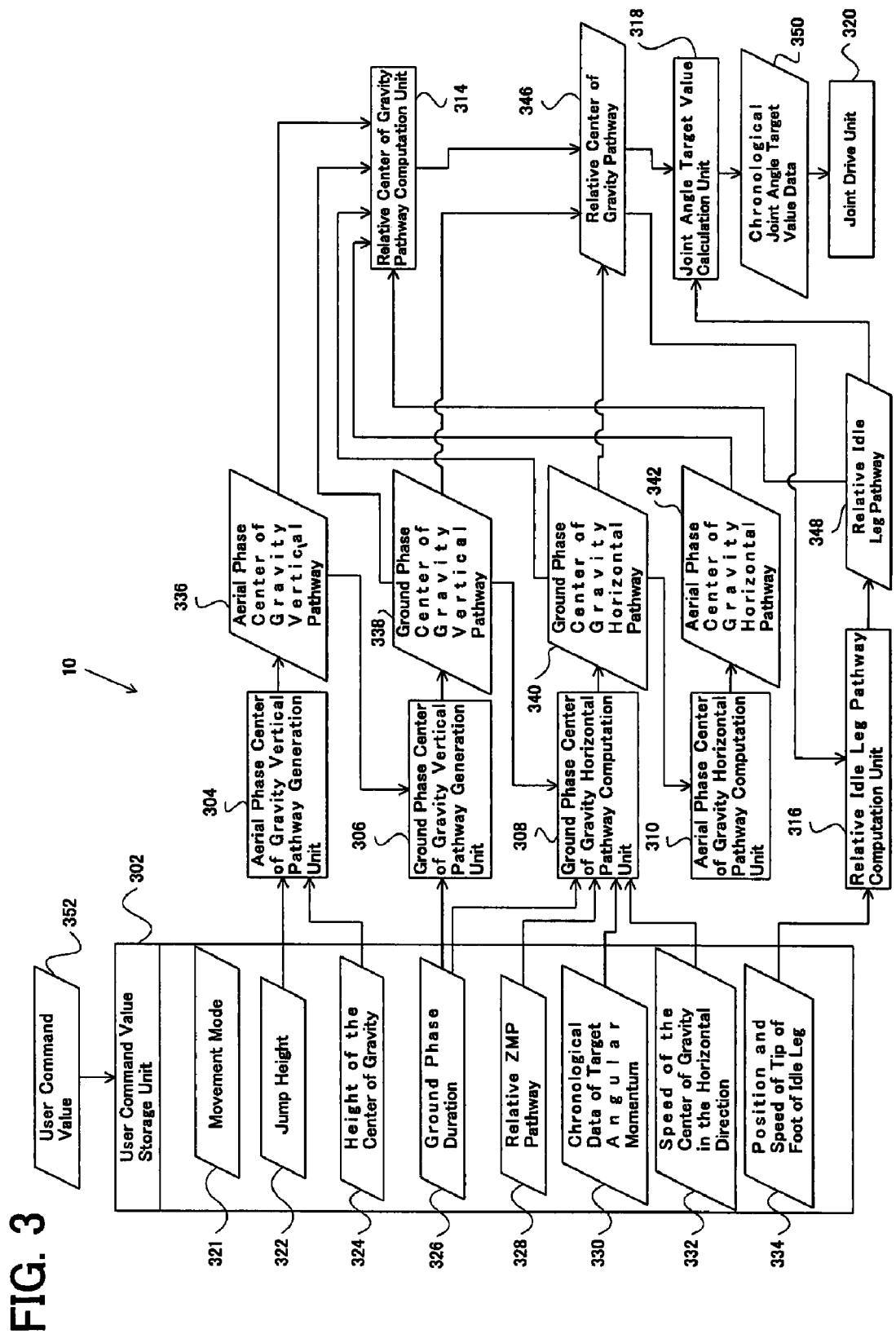
FIG. 3 is a block diagram that shows the components of a control unit 10 of the robot 2 of the present invention.

FIG. 3 is a block diagram showing the constituent functions of the control unit 10. The control unit 10 is comprised of a User Command Value Storage Unit 302, an Aerial Phase Center of Gravity Vertical Pathway Generation Unit 304, a Ground Phase Center of Gravity Vertical Pathway Generation Unit 306, a Ground Phase Center of Gravity Horizontal Pathway Computation Unit 308, an Aerial Phase Center of Gravity Horizontal Pathway Computation Unit 310, a Relative Center of Gravity Pathway Computation Unit 314, a Relative Idle Leg Pathway Computation Unit 316, a Joint Angle Target Value Calculation Unit 318, and a Joint Drive Unit 320. Here, because the center of gravity pathway will be computed and generated, the words computation, generation, and calculation will be used without distinction. Although the word "generation" will be employed because the vertical pathway of the center of gravity will be directly computed from user command values, and the word "computation" will be employed because the horizontal pathway of the center of gravity is computed so as to satisfy the ZMP equation described below, there is no particular technical distinction between the words "generation" and "computation".

The User Command Value Storage Unit 302 will store a user command value 352 that is input from a user. The User Command Value Storage Unit 302 stores data such as (1) movement mode 321, (2) jump height during the aerial phase 322, (3) height of the center of gravity at point of movement change 324, (4) ground phase duration 326, (5) relative ZMP pathway during ground phase 328, (6) chronological data of target angular momentum 330, (7) speed of the center of gravity in the horizontal direction at point of movement change 332, (8) position and speed of tip of foot of idle leg at point of takeoff 334, and the like. Details of this data will be provided below.

When a new user command value 352 is input while the robot 2 is moving, the control unit 10 will replace the user command value stored in the User Command Value Storage Unit 302 with the newly input user command value. Because the control unit 10 computes and generates sequential movement based upon the data stored in the User Command Value Storage Unit 302, the new command value input from the user will be reflected in the movement of the robot 2 generated thereafter. The user can control the movement of the robot 2 in real time by employing the controller 12 such as a joystick or the like to input command values while observing the motion of the robot 2.

The Aerial Phase Center of Gravity Vertical Pathway Generation Unit 304, the Ground Phase Center of Gravity Vertical Pathway Generation Unit 306, the Ground Phase Center of Gravity Horizontal Pathway Computation Unit 308, and the Aerial Phase Center of Gravity Horizontal Pathway Computation Unit 310, will generate the center of gravity pathway of the robot 2 in each time interval, based upon the user command values stored in the User Command Value Storage Unit 302. The center of gravity pathway generated here is expressed with the coordinate system (x, y, z) that is fixed external to the robot 2. However, in the ground phase, it can be handled as data that is expressed with the coordinate system (x', y', z') fixed to the reference point of the robot 2, because the reference point of the robot 2 (positioned on the foot plane of the support leg) will not move with respect to the floor during the ground phase. Details of the processes performed by each pathway generation and computation unit will be described in detail below.

The aerial phase center of gravity vertical pathway 336 is data that expresses the pathway of the center of gravity in the vertical direction in the aerial phase of the robot 2. With the aerial phase center of gravity vertical pathway 336, the reference numeral that indicates the time interval sequence is associated with the pathway of the center of gravity in the vertical direction in the aerial phase during that time interval. Each time the center of gravity pathway in the vertical direction is generated in a particular time interval with the Aerial Phase Center of Gravity Vertical Pathway Generation Unit 304, the aerial phase center of gravity vertical pathway 336 will be refreshed.

Like the aerial phase center of gravity vertical pathway 336, the aerial phase center of gravity horizontal pathway 342 is data that expresses the pathway of the center of gravity in the horizontal direction in the aerial phase of the robot 2. With the aerial phase center of gravity horizontal pathway 342, the reference numeral that indicates the time interval sequence is associated with the pathway of the center of gravity in the horizontal direction in the aerial phase during that time interval. Each time the center of gravity pathway in the horizontal direction is computed in a particular time interval with the Aerial Phase Center of Gravity Horizontal Pathway Computation Unit 310, the aerial phase center of gravity horizontal pathway 342 will be refreshed.

Like the aerial phase center of gravity vertical pathway 336 and the aerial phase center of gravity horizontal pathway 342, the ground phase center of gravity vertical pathway 338 and the ground phase center of gravity horizontal pathway 340 are also data that express the center of gravity pathway of the robot 2 in the ground phase during each time interval. With these data, the reference numeral that indicates the time interval sequence is associated with the pathway of the center of gravity in the ground phase during that time interval. Each time the pathway of the center of gravity is generated in a particular time interval by the corresponding pathway generation unit or computation unit, these data are refreshed.

The Relative Center of Gravity Pathway Computation Unit 314 will compute the relative center of gravity pathway 346 of the robot 2, based upon the center of gravity pathway of the robot 2 generated by the Aerial Phase Center of Gravity Vertical Pathway Generation Unit 304, the Ground Phase Center of Gravity Vertical Pathway Generation Unit 306, the Ground Phase Center of Gravity Horizontal Pathway Computation Unit 308, and the Aerial Phase Center of Gravity Horizontal Pathway Computation Unit 310, and the relative idle leg pathway 348 computed with the Relative Idle Leg Pathway Computation Unit 316.

The relative center of gravity pathway 346 expresses the pathway of the center of gravity with the coordinate system (x', y', z'), whose origin point is the reference point provided on the tip of the foot of the support leg of the robot 2. With the relative center of gravity pathway 346, the reference numeral that indicates the time interval sequence is associated with the relative pathway of the center of gravity during that time interval. Each time the relative pathway of the center of gravity is computed in a particular time interval with the Relative Center of Gravity Pathway Computation Unit 314, the relative center of gravity pathway 346 will be refreshed.

The Relative Idle Leg Pathway Computation Unit 316 computes the relative pathway 348 of the tip of the foot of the idle leg of the robot 2, based upon the relative center of gravity pathway 346 of the robot 2 that is computed with the Relative Center of Gravity Pathway Computation Unit 314, and the user command values that are stored in the User Command Value Storage Unit 302. The relative pathway 348 of the tip of the foot of the idle leg computed here is expressed with the coordinate system (x', y', z') in which the reference point provided on the tip of the foot of the support leg of the robot 2 is the origin point.

The relative idle leg pathway 348 is data that expresses the relative pathway of the reference point on the tip of the foot of the idle leg of the robot 2 in each time interval. With the data, the reference numeral that indicates the time interval sequence is associated with the relative pathway of the reference point on the tip of the foot of the idle leg in that time interval. Each time the relative pathway is computed in a particular time interval with the Relative Idle Leg Pathway Computation Unit 316, the relative idle leg pathway 348 will be refreshed.

The Joint Angle Target Value Calculation Unit 318 will calculate chronological joint angle target value data 350 for each joint of the robot 2, based upon the relative center of gravity pathway 346 of the robot 2 computed with the Relative Center of Gravity Pathway Computation Unit 314, and the relative pathway 348 of the reference point on the tip of the foot of the idle leg of the robot 2 that is computed with the Relative Idle Leg Pathway Computation Unit 316. The chronological joint angle target value data 350 is comprised of chronological data for the target joint angle of each joint of the robot 2.

The Joint Drive Unit 320 will rotate each joint of the robot 2, based upon the chronological joint angle target value data 350.

Figure 4:
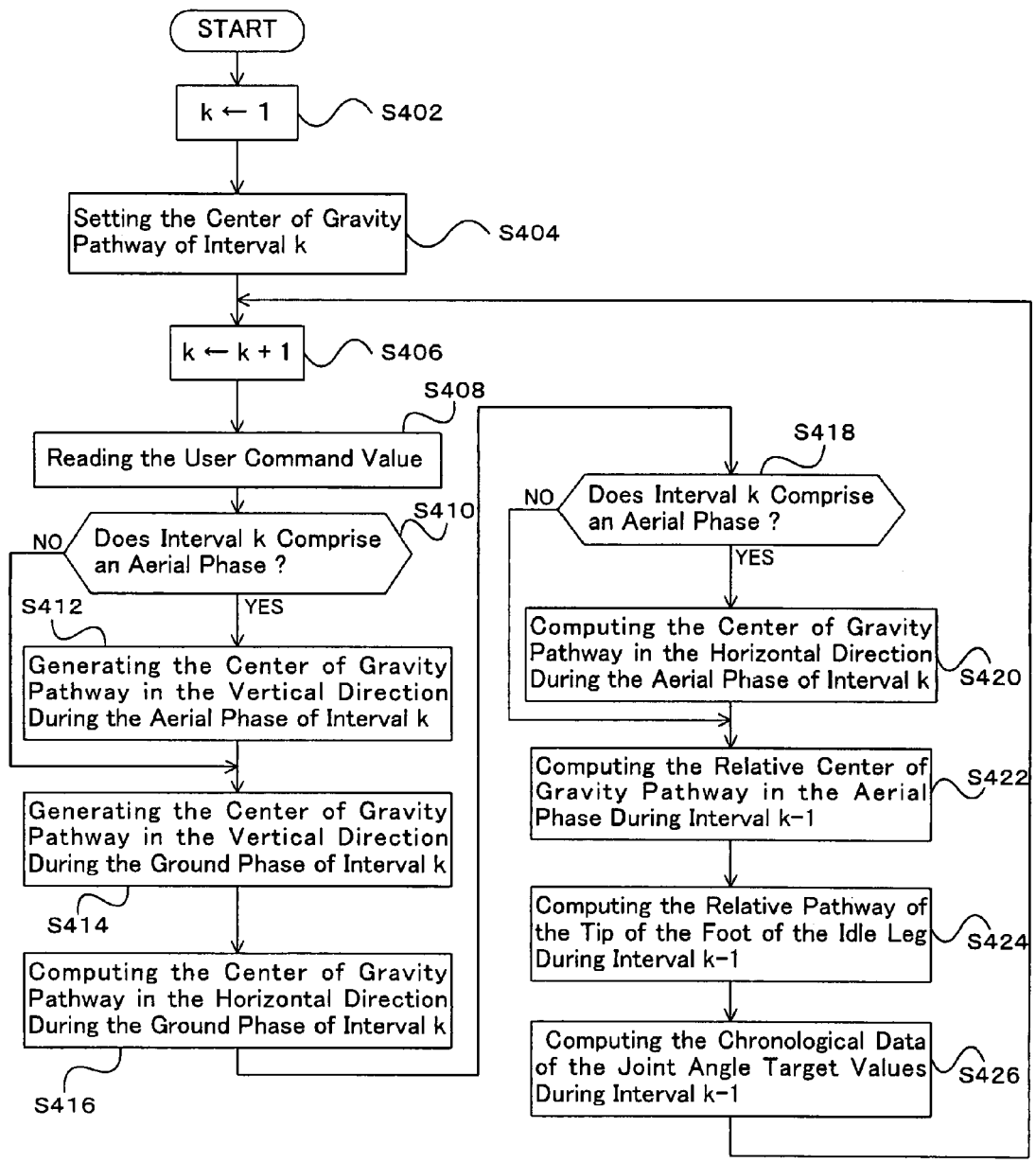
FIG. 4 is a flowchart showing the processes performed by the control unit 10 of the robot 2 of the present invention.

With reference to FIG. 4, the processes performed by the control unit 10 of the robot 2 of the present invention will be described. The processes of FIG. 4 can deal with any movement, but the example described below is one in which the processes of FIG. 4 deal with the movement shown in FIG. 2.

First, in Step S402, a variable k that indicates the number of the time interval in which the movement of the robot is to be generated will be set to 1.

Next, in Step S404, the center of gravity pathway of Interval 1 (the initial interval) will be set. The generation of the center of gravity pathway of Interval 1 that is performed in Step S404 is identical to the generation of the center of gravity pathway in a common Interval k described below from Step S408 to Step S420, and thus a description thereof will be omitted. By executing the process of Step S404, the center of gravity pathways in the vertical direction and the horizontal direction will be generated in Interval 1. As shown in FIG. 2, Interval 1 is comprised of a ground phase and an aerial phase.

The center of gravity pathway generated in Interval 1 is reflected in the aerial phase center of gravity vertical pathway 336, the ground phase center of gravity vertical pathway 338, the ground phase center of gravity horizontal pathway 340, and the aerial phase center of gravity horizontal pathway 342.

In Step S406, 1 will be added to the number k that indicates the time interval in which the movement is to be generated.

In Step S408, the control unit 10 will read out from the User Command Value Storage Unit 302 the user command value relating to the movement to be generated therefrom. The following parameters can be applied as user command values.

(1) Robot 2 movement mode 321
(2) Jump height during aerial phase 322
(3) Height (position in the vertical direction) of the center of gravity at point of movement change 324
(4) Ground phase duration 326
(5) Relative ZMP pathway during ground phase 328
(6) Chronological data of target angular momentum during ground phase and aerial phase 330
(7) Speed of the center of gravity in the horizontal direction at point of movement change 332
(8) Position and speed of tip of foot of idle leg at point of takeoff 334

Item (1), the robot 2 movement mode 321, indicates the characteristics of the movement of the robot 2 during each time interval. The robot 2 movement mode 321 is comprised of a reference numeral that indicates the time interval sequence, a reference numeral that indicates the presence or absence of an aerial phase during each time interval, and a reference numeral that identifies the leg link that will be the support leg in the ground phase of each time interval, and can be freely provided by a user.

Item (2), the jump height during aerial phase 322, is the maximum height to be achieved by the center of gravity of the robot 2 when the movement of the robot 2 comprises an aerial phase, and can be freely provided by a user within the range of capabilities allowed by the actuators of the robot 2.

Item (3), the height (position in the vertical direction) of the center of gravity at point of movement change 324, is the height to be achieved by the center of gravity of the robot 2 when the robot 2 moves between a ground phase and an aerial phase, or moves between a ground phase and a ground phase, and can be freely provided by a user within the geometrically allowable range of the mechanism of the robot 2.

Item (4), the ground phase duration 326, is the duration of the ground phase in each time interval, and can be freely provided by a user.

Item (5), the relative ZMP pathway during ground phase 328, is chronological data on the position of the target ZMP in the ground phase with respect to the reference point on the foot plane of the support leg, and can be freely provided by a user. If, in the ground phase, the ZMP is within the foot plane of the leg link that is the support leg, the robot 2 will not tip over and can continue movement. With the robot 2 of the present embodiment, the relative ZMP pathway during the ground phase is set so as to be fixed in the center of the foot plane of the support leg. When the relative ZMP pathway is implemented in this way, the robot 2 will not tip over, and can achieve stable movement. Note that the relative ZMP pathway in the ground phase may be any pathway, so long as it is maintained inside the foot plane during the ground phase. For example, a pathway may be employed in which the ZMP shifts forward from the rear of the foot plane of the support leg during the ground phase. Here also, when the relative ZMP pathway is implemented in this way, the robot 2 will not tip over, and can achieve stable movement.

Item (6), the chronological data of target angular momentum during ground phase and aerial phase 330, is chronological data on the angular momentum of the rotational movement around the center of gravity achieved by the robot 2, and can be freely provided by a user within the range of capabilities allowed by the actuators of the robot 2. The angular momentum of the robot 2 around the roll axis (x' axis) and the pitch axis (y' axis) can be set so that the robot 2 achieves a desired posture. The angular momentum around the yaw axis (z' axis) can be set so that the robot 2 achieves a desired rotational movement. With the robot 2 of the present embodiment, the angular momentum around the roll axis, the pitch axis, and the yaw axis is set so as to be zero in all time intervals.

Item (7), the speed of the center of gravity in the horizontal direction at point of movement change 332, is the speed in the horizontal direction to be achieved by the center of gravity of the robot 2 when the movement of the robot 2 switches between the ground phase and the aerial phase, or switches between a ground phase and a ground phase, and can be freely provided by a user within the range of capabilities allowed by the actuators of the robot 2.

Item (8), the position and speed of the tip of the foot of the idle leg at point of takeoff 334, is the position and speed of the tip of the foot of the idle leg as seen from the tip of the foot of the support leg at the point in which the robot 2 transfers from the ground phase to the aerial phase, and can be freely provided by a user within the geometrically allowable range of the mechanism of the robot 2.

In Step S410 of FIG. 4, it will be determined whether or not the movement of Interval k comprises an aerial phase. When Interval k comprises an aerial phase (when Step S410 is YES), the process will advance to Step S412 in order to generate movement in the aerial phase of Interval k. When Interval k does not comprise an aerial phase (when Step S410 is NO), the process will advance to Step S414 in order to generate movement in the ground phase of Interval k. For example, when k is 2, the process will advance to Step S412 because the movement of Interval 2 comprises an aerial phase.

In Step S412, the center of gravity pathway in the vertical direction during the aerial phase of Interval k will be generated. In the aerial phase, the robot will float in mid-air, and gravity will be applied to the robot as an external force. Therefore, no matter how the joints of the robot are driven during the aerial phase, the center of gravity pathway will plot a parabola as indicated below.

$$z = -\frac{1}{2}gt^2 + v_{z0}t + z_0$$

g in the equation above is acceleration due to gravity, $v_{z0}$ in the equation above is the speed of the center of gravity in the vertical direction at the point of the takeoff in Interval k, and $z_0$ is the position of the center of gravity in the vertical direction at the point of the takeoff in Interval k. By giving $v_{z0}$ and $z_0$ above, the center of gravity pathway in the vertical direction during the aerial phase can be generated.

$z_0$ above is the height of the center of gravity at the point of the takeoff, and is given by a user as a user command value in Step S408.

In addition, $v_{z0}$ above is the speed of the center of gravity in the vertical direction at the point of the takeoff. $v_{z0}$ can be calculated from the jump height of the user command value provided in Step S408. The speed of the center of gravity in the vertical direction at the point of the takeoff $v_{z0}$ is calculated below by employing the jump height h and the acceleration due to gravity g.

$$v_{z0} = \sqrt{2hg}$$

Note that instead of inputting the jump height h as a user command value, $v_{z0}$ may be provided as a user command value.

Figure 5A:
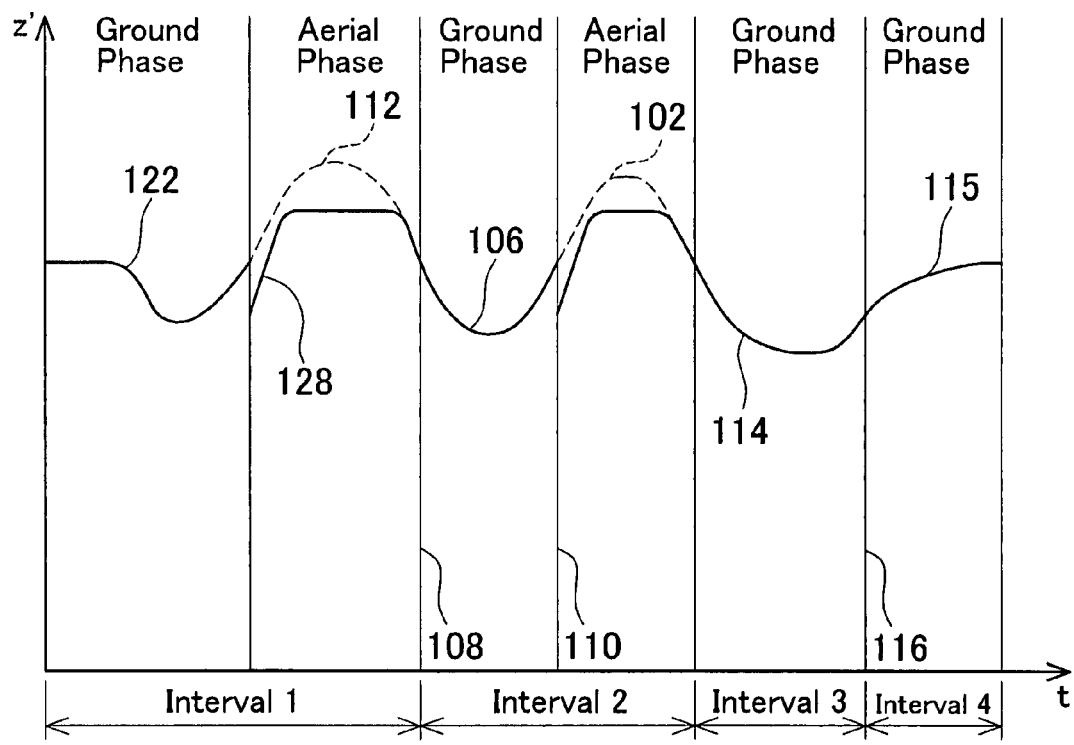
FIG. 5(a) shows the relative pathway in the vertical direction of the center of gravity of the robot 2 that is generated by the control unit 10.

By performing Step S412, the center of gravity pathway of the robot 2 in the vertical direction during the aerial phase can be generated. FIG. 5(a) schematically shows the center of gravity pathway of the robot 2 in the vertical direction. For example, when k is 2, the vertical pathway 102 of the aerial phase of Interval 2 will be generated in Step S412. In addition, the duration of the aerial phase can be calculated from the center of gravity pathway of the robot 2 in the vertical direction during the aerial phase that was generated in Step S412. The calculated duration of the aerial phase is employed in the processes of Step S420 to Step S422.

In Step S414, the center of gravity pathway in the vertical direction during the ground phase of Interval k will be generated. The center of gravity in the vertical direction during the ground phase of Interval k will be generated so as to smoothly connect with the center of gravity pathway in the vertical direction of the movement before and after the ground phases.

Based upon the previously generated center of gravity pathway in the vertical direction of Interval k−1, the position and speed of the center of gravity in the vertical direction at the beginning of the ground phase of Interval k is matched with the position and speed of the center of gravity in the vertical direction at the completion of Interval k−1. For example, when k is 2, the position and speed of the center of gravity in the vertical direction at the point of completion 108 of Interval 1 will be determined based upon the previously generated center of gravity pathway 112 in the vertical direction in the aerial phase of Interval 1, and the position and speed that was determined will be the starting conditions for Interval k.

The position and speed of the center of gravity in the vertical direction at the completion of the ground phase of Interval k will match the position and speed of the center of gravity in the vertical direction at the beginning of the following aerial or ground phase.

When Interval k comprises an aerial phase, the position and speed of the center of gravity in the vertical direction at the completion of the ground phase can be set from the center of gravity pathway in the vertical direction in the aerial phase that was previously generated in Step S412. For example, when k is 2, the position and speed of the center of gravity in the vertical direction at the completion of the ground phase 110 will determine the position and speed of the center of gravity in the vertical direction at the beginning of the aerial phase 110 from the center of gravity pathway in the vertical direction 102 during the aerial phase that was previously generated in Step S412, and the position and speed that were determined will be the conditions at the completion of the ground phase.

Or, when Interval k does not comprise an aerial phase, and the completion of the ground phase is connected with the beginning of the ground phase of Interval k+1, the position of the center of gravity in the vertical direction at the completion of Interval k can be set from a user command value provided in Step S408. In this situation, the speed of the center of gravity in the vertical direction can be freely provided. For example, when k is 3, Interval 3 does not comprise an aerial phase, and the completion 116 of the center of gravity pathway in the vertical direction in the ground phase will connect with the center of gravity pathway 115 (yet to be generated at this point) in the vertical direction of the ground phase of Interval 4 that is the next time interval. In this situation, the center of gravity height 324 given in Step S408 will be employed as the position of the center of gravity in the vertical direction. The speed of the center of gravity in the vertical direction can be freely provided.

Based on the conditions at the beginning and the completion of the ground phase that were set as described above, polynomial interpolation will be employed to generate the center of gravity pathway in the vertical direction in the ground phase. For example, by making the position and speed at the beginning and the completion of the pathway restrictive conditions, and by means of an interpolation that employs a second or third degree polynomial, the center of gravity pathway in the vertical direction during the ground phase of Interval k will be generated. As a result, for example, when the speed in the vertical direction at the beginning of the ground phase is zero, and the speed in the vertical direction at the completion of the ground phase is $v_{z0}$, a speed in the vertical direction can be generated that will increase from the crouch in the ground phase, and will reach the speed $v_{z0}$ at completion.

By performing the process of Step S414, the center of gravity pathway in the vertical direction during the ground phase of Interval k can be generated. The center of gravity pathway in the vertical direction that is generated by the aforementioned processes is expressed with the coordinate system (x, y, z) that is fixed external to the robot. However, because the foot plane of the support leg on which the reference point of the robot is located will not move in the ground phase, the aforementioned pathway can be easily expressed as is with the coordinate system (x', y', z'). In FIG. 5(a), the pathway expressed with the coordinate system (x, y, z) is indicated with a broken line, and the pathway expressed with the coordinate system (x', y', z') is indicated with a solid line.

In Step S416, the center of gravity pathway in the horizontal direction during the ground phase of Interval k will be computed. The center of gravity pathway in the horizontal direction is determined based upon the center of gravity pathway in the vertical direction in that ground phase, the target relative ZMP pathway, the chronological data for the target angular momentum, and the speeds of the center of gravity in the horizontal direction at the beginning and the completion of that ground phase. In Step S416, the center of gravity pathway in the horizontal direction will be computed so that the actual relative ZMP pathway that is achieved when the center of gravity pathway in the vertical and horizontal directions are implemented will match the target relative ZMP pathway.

The center of gravity pathway in the vertical direction during the ground phase of Interval k has already been generated in Step S414. The target relative ZMP pathway and the chronological data for the angular momentum are provided as user command values in Step S408. The speed of the center of gravity in the horizontal direction at the beginning of the ground phase is given by determining the speed of the center of gravity in the horizontal direction at the completion of Interval k−1 from the previously generated center of gravity pathway of Interval k−1. The speed of the center of gravity in the horizontal direction at the completion of the ground phase is provided in Step S408 as a user command value. In Step S420, the center of gravity pathway in the horizontal direction in the ground phase will be computed so as to satisfy these conditions.

The computation of the center of gravity in the horizontal direction during the ground phase will be described below. The relative ZMP position ($p_{x'}$, $p_{y'}$) that the robot 2 will implement can be computed from the relative position of the center of gravity (x', y', z') of the robot 2 and the angular speed ($\omega_{x'}$, $\omega_{y'}$) around the center of gravity of the robot 2. The ZMP actually produced will be computed from the relative position of the center of gravity of the robot 2 and the angular speed around the center of gravity of the robot 2 by means of the ZMP equation below.

$$p_{x'} = \frac{mx'^{(2)}z' - mz'^{(2)}x' - I_{y'}\omega_{y'}^{(1)}}{f_{z'}}$$

$$p_{y'} = \frac{my'^{(2)}z' - mz'^{(2)}y' - I_{x'}\omega_{x'}^{(1)}}{f_{z'}}$$

Here, $^{(1)}$ indicates the first differential with respect to time t, and $^{(2)}$ indicates the second differential with respect to time t. In addition, m is the mass of the robot 2, and $f_{z'}$ is the floor reaction force applied to the robot 2 from the foot plane of the support leg.

z' and $z'^{(2)}$ of the equation are the position in the vertical direction and the acceleration in the vertical direction, of the center of gravity originating on the tip of the foot of the support leg of the robot 2. Because the tip of the foot of the support leg of the robot 2 will not move in the ground phase, z' and $z'^{(2)}$ can be defined from the center of gravity pathway in the vertical direction that was generated in Step S414.

$I_{x'}\omega_{x'}^{(1)}$ and $I_{y'}\omega_{y'}^{(1)}$ indicate the effects of the inertia of the center of gravity that will rotate around the tip of the foot of the support leg in the ground phase. In the present embodiment, the angular momentum around the roll axis (x' axis) and the pitch axis (y' axis) is zero in all time intervals, and $I_{x'}\omega_{x'}^{(1)}$ and $I_{y'}\omega_{y'}^{(1)}$ are zero.

An equation that will calculate the chronological data for the position (x', y') of the center of gravity in the horizontal direction can be derived by means of the discretization of the aforementioned ZMP equation. Discretization here means employing a unit time $\Delta t$ with respect to time t as noted above. For example, the following relational expression will be obtained with respect to the center of gravity pathway in the x' direction.

$$p_{x'i} = a_i x'_{i-1} + b_i x'_i + c_i x'_{i+1}$$

Here, $x'_i$ is variable in which the center of gravity pathway x'(t) in the x' direction have been discretized, and $p_{x'i}$ is variable in which the relative ZMP pathway $p_{x'}(t)$ in the x' direction have been discretized; i indicates time sequences divided by units of time. The equation described above indicates that the coordinate $p_{x'i}$ of the ZMP in the x' direction at time i can be computed from the immediately prior coordinate $x'_{i-1}$ in the x' direction, the current coordinate $x'_i$ in the x' direction, and the immediately following coordinate $x'_{i+1}$ in the x' direction. The coefficients $a_i$, $b_i$, $c_i$ are coefficients that are calculated by means of the following.

$$a_i = c_i = -\frac{z'_i}{(z'^{(2)}_i + g)\Delta t^2}$$

$$b_i = 1 - 2a_i$$

The aforementioned $\Delta t$ is a time period in which the discretization of the ZMP equation is employed, and $z'_i$ and $z'^{(2)}_i$ are variables in which the position and acceleration of the center of gravity have been respectively discretized. In the present embodiment, $\Delta t$ is a time period in which the duration of the ground phase is divided into n equal portions.

With the robot 2 of the present embodiment, the movement of the robot 2 will be computed so that the center of gravity pathway will smoothly change at the beginning and the completion of the ground phase. By computing the movement in this way, the position of the center of gravity of the robot 2 will smoothly transition, and the robot will achieve stable movement, even in situations in which, for example, the robot jumps and lands, or situations in which the support leg is switched.

The speed $v_{x'0}$ of the center of gravity in the x' direction at the beginning of Interval k is expressed as follows, using the divided time period $\Delta t$ and the center of gravity positions $x'_0$, $x'_1$.

$$v_{x'0}\Delta t = x'_1 - x'_0$$

The speed $v_{x'0}$ of the center of gravity in the x' direction at the beginning of Interval k is set from the center of gravity pathway of Interval k−1, which is previously computed. For example, when k is 2, the speed $v_{x'0}$ of the center of gravity in the x' direction at the beginning 108 of Interval 2 is defined from the pathway 120 in the horizontal direction of Interval 1 as the speed of the center of gravity in the horizontal direction at the completion 108 of Interval 1.

In the same way, the speed $v_{x'n-1}$ of the center of gravity in the x' direction at the completion of Interval k is related to the divided time period $\Delta t$, and the center of gravity positions $x'_{n-2}$, $x'_{n-1}$ as follows.

$$v_{x'n-1}\Delta t = x'_{n-1} - x'_{n-2}$$

The speed $v_{x'n-1}$ of the center of gravity in the x' direction at the completion of Interval k is set as a user command value in Step S408.

Adjusting the aforementioned relationship, the center of gravity pathway ($x'_0$, $x'_1$, ..., $x'_{n-1}$) in the x' direction during the ground phase of Interval k, on which the relative ZMP pathway to be implemented will be equal to the target relative ZMP pathway, can be calculated by solving the following equation represented by a tridiagonal matrix.

$$\begin{bmatrix} -1 & 1 & 0 & 0 & & & & & \\ a_1 & b_1 & c_1 & 0 & & 0 & & & \\ 0 & a_2 & b_2 & c_2 & & & & & \\ & & & O & & & & & \\ & & & & O & & & & \\ & & & & & O & & & \\ 0 & & & & & a_{n-3} & b_{n-3} & c_{n-3} & 0 \\ & & & & & 0 & a_{n-2} & b_{n-2} & c_{n-2} \\ & & & & & 0 & 0 & -1 & 1 \end{bmatrix} \begin{bmatrix} x'_0 \\ x'_1 \\ x'_2 \\ M \\ M \\ M \\ x'_{n-3} \\ x'_{n-2} \\ x'_{n-1} \end{bmatrix} = \begin{bmatrix} v_{x'0}\Delta t \\ p_{x'1} \\ p_{x'2} \\ M \\ M \\ M \\ p_{x'n-3} \\ p_{x'n-2} \\ v_{x'n-1}\Delta t \end{bmatrix}$$

In the equation above, the left side is represented by the product of a matrix and a column vector, and the matrix is tridiagonal matrix having coefficients that are computed from the pathway in the vertical direction. A tridiagonal matrix is a matrix in which only the diagonal section and the sub-diagonal section adjacent thereto comprise significant values, and the sections other than these are zero. The column vector on the left side is a column vector that indicates the center of gravity pathway ($x'_0$, $x'_1$, ..., $x'_{n-1}$) in the x' direction. The column vector on the right side is a column vector that comprises the target relative ZMP pathway, a value $v_{x'0}\Delta t$ that is the beginning speed $v_{x'0}$ of the center of gravity in the x' direction multiplied by the unit time Δt and converted to a distance, and the value $v_{x'_{n-1}}\Delta t$ that is the completion speed $v_{x'_{n-1}}$ of the center of gravity in the x' direction multiplied by the unit time Δt and converted to a distance.

In the equation above, the unknown quantity $(x'_0, x'_1, \ldots, x'_{n-1})$ can be computed by calculating the inverse matrix of the tridiagonal matrix on the left side, and computing the product of that inverse matrix and the right side. Therefore, the center of gravity pathway in the x' direction can be computed.

With the aforementioned computation, the center of gravity pathway in the horizontal direction will not be computed by trial and error. The center of gravity pathway in the horizontal direction can be directly computed that satisfies the target relative ZMP pathway. The aforementioned computation can be performed with little computational effort, and the Ground Phase Center of Gravity Horizontal Pathway Computation Unit 308 can perform this computation at high speed.

Figure 5B:
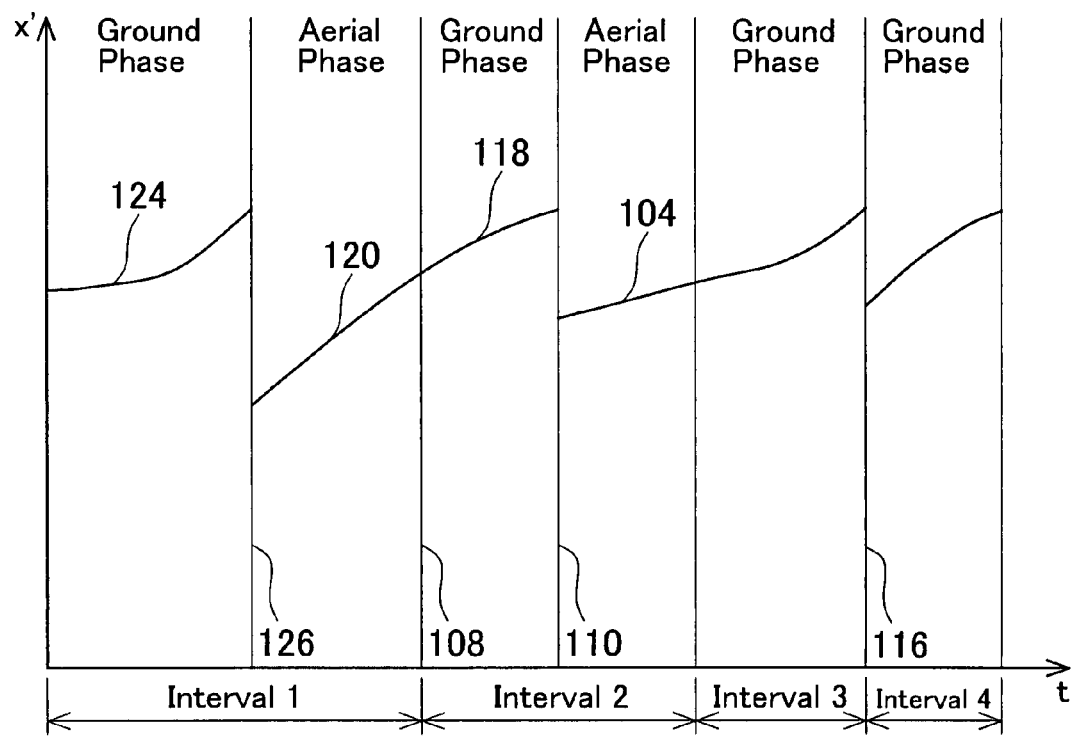
FIG. 5(b) shows the relative pathway in the horizontal direction of the center of gravity of the robot 2 that is generated by the control unit 10.
Figure 6:
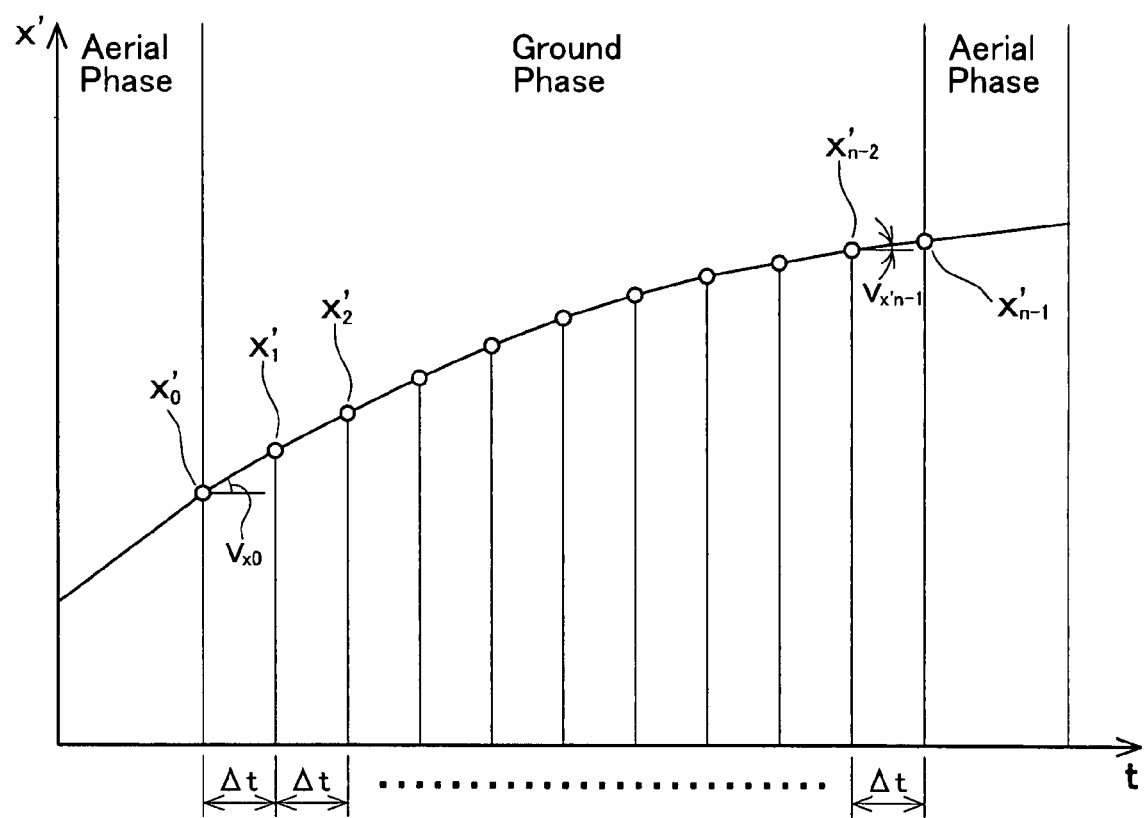
FIG. 6 shows a portion of the pathway of the center of gravity of the robot 2 that is generated by the control unit 10.

FIG. 5(b) shows the center of gravity pathway of the robot in the horizontal direction. For example, when k is 2, the horizontal pathway 118 of the ground phase of Interval 2 will be generated in Step S416. In FIG. 6, details of the pathway $(x'_0, x'_1, \ldots, x'_{n-1})$ in the x' direction that is computed in Step S416 when k is 2 are shown.

In addition, the center of gravity pathway $(y'_0, \ldots, y'_{n-1})$ in the y' direction during the ground phase of Interval k can be calculated in the same way as the center of gravity pathway $(x'_0, x'_1, \ldots, x'_{n-1})$ in the x' direction, from the relative ZMP position $(p_{y'1}, \ldots, p_{y'n-2})$ in the y' direction, and the beginning speed $v_{y'0}$ and the completion speed $v_{y'n-1}$ in the ground phase of Interval k.

Note that instead of the aforementioned speeds $v_{x'0}, v_{y'0}$ in the horizontal direction, user may provide horizontal unit vectors $n_{x'}, n_{y'}$ that indicate the direction in which the center of gravity moves and a speed magnitude |v| as command values. In this situation, the speeds $v_{x'0}, v_{y'0}$ in the horizontal direction will be calculated by means of the following.

$$v_{x'0} = |v| \cdot n_{x'}$$

$$v_{y'0} = |v| \cdot n_{y'}$$

By performing the processes of Step S414 and Step S416, the center of gravity pathway during the ground phase can be generated. For example, when k is 2, the center of gravity pathway during the ground phase of Interval 2 can be generated. In the ground phase of Interval 2, movement can be achieved in which a jump is included in the aerial phase of Interval 2 that follows the ground phase, and the center of gravity of the robot 2 can be lowered. In addition, in the ground phase of Interval 2, movement will also be achieved that lessens the landing impact caused by the aerial phase of the immediately preceding Interval 1 by lowering the center of gravity.

By achieving the center of gravity pathway generated by the aforementioned processes, the robot 2 can maintain the ZMP inside the foot plane of the support leg while achieving movement that moves the center of gravity vertically.

When the center of gravity pathway is generated by the method described above, there is no guarantee that ZMP computed with the ZMP equation will match the target ZMP at the beginning and the completion of the ground phase. However, because the center of gravity speed is smoothly connected at the beginning and the completion of the ground phase, and the time period in which the ZMP equation is not satisfied is extremely short (about two times the time width Δt that employs the discretization of the ZMP equation), a robot that achieves the movement generated above will not tip over and will move in a stable fashion.

In Step S418, it will be determined whether or not the movement of Interval k comprises an aerial phase. When Interval k comprises an aerial phase (when Step S418 is YES), the process will advance to Step S420 in order to compute the movement in the aerial phase of Interval k. When Interval k does not comprise an aerial phase (when Step S418 is NO), the process will advance to Step S422. For example, when k is 2, the process will advance to Step S420 because the movement of Interval 2 comprises an aerial phase.

In Step S420, the center of gravity pathway in the horizontal direction during the aerial phase of Interval k will be computed. In the aerial phase, the robot will float in mid-air, and gravity will be applied to the robot as an external force. Therefore, no matter how the joints of the robot are driven in the aerial phase, the center of gravity of the robot will move with uniform linear motion in the horizontal direction as shown below.

$$x = v_{x0}t + x_0$$

$$y = v_{y0}t + y_0$$

The $v_{x0}, v_{y0}$ of the above equation is the speed of the center of gravity in the horizontal direction at the point in which the robot jumps up, and $x_0, y_0$ is the position of the center of gravity in the horizontal direction at the point the robot jumps up. The aforementioned $v_{x0}, v_{y0}$ is both the speed of the center of gravity in the horizontal direction at the point in which the robot jumps up, and the speed of the center of gravity in the horizontal direction at the point in which the robot lands. $v_{x0}, v_{y0}$ is equivalent to the speed of the center of gravity in the horizontal direction when the robot switches movement, and will be provided as a user command value in Step S408.

The aforementioned $x_0, y_0$ is the position of the center of gravity in the horizontal direction at the point the robot jumps up, and is equivalent to the position of the center of gravity in the horizontal direction at the completion of the ground phase of Interval k that was previously computed in Step S416.

By providing the aforementioned $v_{x0}, v_{y0}, x_0, y_0$, the center of gravity pathway in the horizontal direction can be computed.

In Step S422, the relative center of gravity pathway in the aerial phase during Interval k−1 will be computed. The relative center of gravity pathway of the aerial phase is computed from the positional relationship between the center of gravity and the tip of the foot of the support leg. Because the support leg also moves with respect to the floor in the aerial phase, computing the relative center of gravity pathway is equivalent to computing the pathway of the tip of the foot of the support leg with respect to the center of gravity. The pathway of the tip of the foot of the support leg during the aerial phase must be computed so as to smoothly connect with the pathways of the tip of the foot of the support leg during the ground phases before and after the aerial phase. Because the relative positions of the center of gravity and the tip of the foot of the support leg during the aerial phase must smoothly connect with the relative positions of the center of gravity and the tip of the foot of the support leg during the following ground phase, the relative center of gravity pathway of the aerial phase of Interval k−1 will be computed after the relative center of gravity pathway in the ground phase of Interval k is computed. For example, when k is 2, the relative center of gravity pathways 128, 120 during the aerial phase of Interval 1 in FIGS. 5(a) and (b) will be computed after the relative center of gravity pathways 106, 118 during the ground phase of Interval 2 are generated.

Note that in FIGS. 5(a) and 5(b), because the support leg changes when the movement switches from the ground phase to the aerial phase, the relative center of gravity pathway (the curved line shown with a solid line) changes discontinuously. One must take care that the pathways of the center of gravity and the tip of the foot of the support leg as seen from the exterior of the robot 2 are respectively continuous pathways.

At the point in which the robot 2 jumps up, there will be times in which the support leg will change, and times in which the support leg will not change. For example, when the robot jumps up with one leg link as the support leg, and lands with another leg link as the support leg after passing through the aerial phase, the support leg will be changed at the point of jumping. In contrast, when the robot jumps up with one leg link as the support leg, and lands with the same leg link as the support leg after passing through the aerial phase, the support leg will not be changed at the point of jumping.

When the support leg changes at the point of jumping, the relative pathway of the support leg at the beginning of the aerial phase of Interval k−1 (i.e., the relative center of gravity pathway) will be set so as to smoothly connect with the relative pathway of the idle leg with respect to the center of gravity at the completion of the ground phase of Interval k−1. The relative position and speed of the tip of the idle leg with respect to center of gravity at the completion of the ground phase of Interval k−1 can be calculated from the position and speed of the tip of the foot of the idle leg at point of takeoff 334 of the user command value, and from the relative center of gravity pathway at the completion of the ground phase of Interval k−1.

When the support leg does not change at the point of jumping, the relative pathway of the support leg at the beginning of the aerial phase of Interval k−1 (i.e., the relative center of gravity pathway) will be set so as to smoothly connect with the relative pathway of the support leg (i.e., the relative center of gravity pathway) in the ground phase of Interval k−1. In other words, the relative position and speed of the center of gravity at the completion of the ground phase of Interval k−1 are determined from the relative center of gravity pathway during the ground phase of Interval k−1, and are set as the relative position and speed of the center of gravity at the beginning of the aerial phase of Interval k−1.

For example, when k is 2, the support leg at the jumping point of the aerial phase of Interval 1 will change from the left leg link 6 to the right leg link 8. Therefore, for calculating the relative center of gravity pathways 128, 120 of the aerial phase of Interval 1 of FIGS. 5(a) and (b), the relative position and speed of the center of gravity at the beginning 126 of that aerial phase will be calculated from the position and speed of the tip of the foot of the idle leg at the point of takeoff 334 of the user command value, and the relative center of gravity pathways 122, 124 at the completion of the ground phase of Interval 1.

At the landing point, the relative center of gravity pathways in the aerial phase of Interval k will be computed so that the relative center of gravity pathways at the beginning of the ground phase of Interval k smoothly connect. The relative center of gravity pathways during the ground phase of Interval k are already provided in Step S414 and Step S416. In other words, the relative position and speed of the center of gravity at the beginning of the ground phase of Interval k are determined from the relative center of gravity pathways during the ground phase of Interval k, and are set as the relative position and speed of the center of gravity at the completion of the aerial phase of Interval k−1. For example, when k is 2, to compute the relative center of gravity pathways 128, 120 in the aerial phase of Interval 1 of FIGS. 5(a) and (b), the relative position and speed of the center of gravity at the completion 108 of that aerial phase will be matched with the relative position and speed of the center of gravity at the beginning 108 of that ground phase of Interval 2, based upon the relative center of gravity pathways 106, 118 during the ground phase.

The relative center of gravity pathway in the aerial phase of Interval k−1 can be computed by employing, for example, polynomial interpolation based upon the aforementioned beginning and completion conditions.

In Step S424 of FIG. 4, the relative pathway of the tip of the foot of the idle leg during Interval k−1 will be computed. The relative pathway of the tip of the foot of the idle leg during Interval k−1 is computed so as to smoothly connect the movements of the leg links before and after Interval k−1.

The relative position and speed of the tip of the foot of the idle leg in the beginning of the ground phase of Interval k−1 are set so as to smoothly move the tip of the foot of the leg link that is the idle leg in the beginning of Interval k−1, based on the relative center of gravity pathway during Interval k−2 (i.e., the relative pathway of the support leg with respect to the center of gravity), and the respective relative pathways of the center of gravity and the idle leg during Interval k−2.

The relative pathway of the tip of the foot of the idle leg at the completion of the ground phase of Interval k−1 will be handled differently when Interval k−1 comprises an aerial phase and when it does not.

When Interval k−1 comprises an aerial phase, the position and speed of the tip of the foot of the idle leg at the jumping point is provided as a user command value in Step S408. Therefore, the tip of the foot of the idle leg at the completion of the ground phase of Interval k−1 is set so as to match the user value command.

When Interval k−1 does not comprise an aerial phase, the completion of the ground phase of Interval k−1 connects with the beginning of the ground phase of Interval k. When moving from ground phase to ground phase, the leg link that will be the support leg is changed. Therefore, with the robot 2 of the present embodiment, the position and speed of the idle leg at the completion of the ground phase of Interval k−1 will be set so that the movement of the tip of the foot of the leg link will be smooth, based upon the position and speed of the center of gravity at the completion of the ground phase of Interval k−1, and the relative position and speed of the center of gravity in the beginning of Interval k.

When Interval k−1 comprises an aerial phase, the relative pathway of the tip of the foot of the idle leg during the aerial phase will be computed by means of the foregoing. The relative pathway of the tip of the foot of the idle leg during the aerial phase will be handled differently when the support leg is changed at the takeoff and when it is not changed at the takeoff.

When the support leg is changed at the takeoff, the relative position and speed of the tip of the foot of the idle leg with respect to the center of gravity at the beginning of the aerial phase of Interval k−1 will match the relative position and speed of the tip of the foot of the support leg with respect to the center of gravity at the completion of the ground phase of Interval k−1. The relative position and speed of the tip of the foot of the idle leg at the completion of the aerial phase of Interval k−1 can be freely provided.

When the support leg is not changed at the takeoff, the relative position and speed of the tip of the foot of the idle leg with respect to the center of gravity at the beginning of the aerial phase of Interval k−1 will match the relative position and speed of the tip of the foot of the idle leg with respect to the center of gravity at the completion of the ground phase of Interval k−1. The relative position and speed of the tip of the foot of the idle leg at the completion of the aerial phase of Interval k−1 can be freely provided.

The computation of the relative pathway of the tip of the foot of the idle leg described above can be performed by employing, for example, a polynomial interpolation based upon the position and speed conditions at the beginning and the completion of the ground phase, and if needed, the aerial phase.

In Step S424, the target values of the joint angles will be calculated to achieve the relative pathways of the center of gravity and the idle leg computed by the processes described above. The target values of the joint angles can be calculated by the so-called reverse kinematics calculation. The relative translational momentum of the center of gravity $P_g$, the relative angular momentum of the center of gravity $L_g$, the relative speed $v_f$ of the tip of the foot of the idle leg, and the angular speed $\omega_f$ of the tip of the foot of the idle leg are expressed as follows, employing the joint angle angular speed $\theta^{(1)}$, and the respective Jacobi matrices $J_g(\theta)$, $K_g(\theta)$, $J_f(\theta)$, $K_f(\theta)$.

$$P_g = J_g \theta^{(1)}$$

$$L_g = K_g \theta^{(1)}$$

$$v_f = J_f \theta^{(1)}$$

$$\omega_f = K_f \theta^{(1)}$$

The angular speed $\theta^{(1)}$ of the joint angle in the above equation is the first derivative of the angle $\theta$ of the joint angle with respect to time. The angle $\theta$ of the joint angle is, as shown below, a group of joint angles $(\theta_1, \theta_2, \ldots, \theta_{n-1})$.

$$\theta = \begin{bmatrix} \theta_1 \\ \theta_2 \\ M \\ \theta_{n-2} \\ \theta_{n-1} \end{bmatrix}$$

The relative translational momentum of the center of gravity $P_g$, the relative angular momentum of the center of gravity $L_g$, the relative speed $v_f$ of the tip of the foot of the idle leg, and the angular speed $\omega_f$ of the tip of the foot of the idle leg are respectively as follows.

$$P_g = \begin{bmatrix} mx_g^{(1)} \\ my_g^{(1)} \\ mz_g^{(1)} \end{bmatrix}$$

$$L_g = \begin{bmatrix} I\theta_{gx}^{(1)} \\ I\theta_{gy}^{(1)} \\ I\theta_{gz}^{(1)} \end{bmatrix}$$

$$v_f = \begin{bmatrix} x_f^{(1)} \\ y_f^{(1)} \\ z_f^{(1)} \end{bmatrix}$$

$$\omega_f = \begin{bmatrix} \theta_{xf}^{(1)} \\ \theta_{yf}^{(1)} \\ \theta_{zf}^{(1)} \end{bmatrix}$$

Jacobi matrices for the tip of the foot of the idle legs exist enough for the number of idle legs. The robot 2 of the present embodiment comprises two leg links, in which one leg link is the idle leg, and calculates the target value of the joint angle. The joint angle speed $\theta^{(1)}$ that satisfies the target movements $P_g$, $L_g$, $v_f$, and $\omega_f$ of the robot 2 is a redundant system having a countless number of solutions. With the robot 2 of the present embodiment, chronological data for the target joint angle will be calculated, in which the parameters are achieving the target relative speed of the center of gravity as a first subtask, achieving the target angular momentum as a second subtask, and achieving the target relative pathway of the tip of the foot of the idle leg as a third subtask. A method has been proposed in the past of acquiring the restraint parameters expressed by the plurality of Jacobi matrices noted above, and prioritizing each parameter, while obtaining the optimal solution to the extent that redundancy allows, and thus an explanation thereof will be omitted.

By performing the aforementioned processes, the center of gravity pathway, the target angular momentum, and the pathway of the tip of the foot of the idle leg will be the restraint parameters, and the target values of the joint angles can be calculated. In this way, a stable movement pattern of the robot 2 can be generated. By means of the method noted above, not only the legs, but all of robot's degrees of freedom, such as the arms, trunk, etc., can be employed to generate movement patterns, and more natural and flexible movement patterns can be created.

The chronological data 350 of the joint angle target values calculated in Step S426 is stored in the control unit 10. After Step S426, the process will move to Step S406, and the processes from Step S406 to Step S426 will be repeatedly performed.

The control unit 10 drives each joint of the robot 2 with the Joint Drive Unit 320 based upon the chronological data 350 of the joint angle target values, in parallel with performing the aforementioned processes of FIG. 4. In this way, the robot 2 achieves stable movement based upon user command values.

In the aforementioned embodiment, a legged robot comprising two leg links was described, but the present invention can also be embodied as a legged robot comprising three or more legs, or embodied as a legged robot comprising only one leg.

Although an embodiment of the present invention was described in detail above, this is simply an illustration, and does not limit the scope of the patent claims. Various modifications and changes to the specific example illustrated above are included within the technical scope of the disclosure of the patent claims.

In addition, the technological elements described in the present specification or drawings exhibit technological utility either alone or in various combinations, and are not to be limited to the combination of the claims disclosed at the time of application. Furthermore, the technology illustrated in the present specification, or drawings, simultaneously achieves a plurality of objects, and the achievement of even one object from amongst these has technological utility.

The invention claimed is:

1. A legged robot that achieves "crouching, taking off, floating, landing, and crouching" movements by changing joint angles, wherein a period from the beginning of the crouching to the taking off is an prior ground phase, a period during the floating is an aerial phase, a period from the landing to the completion of the crouching is a posterior ground phase, a change in the height of a center of gravity with respect to time is a vertical pathway, and a change in a horizontal position of the center of gravity with respect to time is a horizontal pathway, the legged robot comprising:

means for generating the vertical pathway of the prior ground phase, means for computing the horizontal pathway of the prior ground phase, based upon the generated vertical pathway of the prior ground phase, a tridiagonal equation which is a discretization of a ZMP equation of the prior ground phase, a target ZMP of the prior ground phase, and horizontal speeds of the center of gravity at the beginning and the completion of the prior ground phase, means for computing chronological data of target values of the joint angles of the prior ground phase, based upon the generated vertical pathway and the computed horizontal pathway of the prior ground phase, means for generating the vertical pathway of the posterior ground phase, means for computing the horizontal pathway of the posterior ground phase, based upon the generated vertical pathway of the posterior ground phase, a tridiagonal equation which is a discretization of a ZMP equation of the posterior ground phase, a target ZMP of the posterior ground phase, and horizontal speeds of the center of gravity at the beginning and the completion of the posterior ground phase, means for computing chronological data of target values of the joint angles of the posterior ground phase, based upon the generated vertical pathway and the computed horizontal pathway of the posterior ground phase, and means for rotating the joints based upon the computed chronological data of the target values of the joint angles.

2. The legged robot of claim 1, wherein each one of the means for computing the horizontal pathway of the prior ground phase and the posterior ground phase comprises means for solving simultaneous equations formed between a tridiagonal matrix having coefficients that are computed from the vertical pathway, and a horizontal pathway column and a distance column that is computed from the target ZMP and the horizontal speeds of the center of gravity at the beginning and the completion of the ground phase, to compute the horizontal pathway.

3. The legged robot of claim 1, wherein each one of the means for generating the vertical pathway of the prior ground phase and the posterior ground phase polynomially interpolates between the vertical positions and speeds of the center of gravity at the beginning and the completion of the ground phase, to generate the vertical pathway.

4. A legged robot that moves a center of gravity in a vertical direction when one leg link is grounded by changing joint angles, the legged robot comprising:

means for generating a vertical pathway of the center of gravity, means for computing a horizontal pathway of the center of gravity, based upon the generated vertical pathway of the center of gravity, a tridiagonal equation which is a discretization of a ZMP equation, a target ZMP, and horizontal speeds of the center of gravity at the beginning and the completion of the vertical pathway, means for computing chronological data of target values of the joint angles, based upon the generated vertical pathway and the computed horizontal pathway of the center of gravity, and means for rotating the joints based upon the computed chronological data of the target values of the joint angles.

5. A control method of a legged robot that achieves "crouching, taking off, floating, landing, and crouching" movements by changing joint angles, wherein a period from the beginning of the crouching to the taking off is an prior ground phase, a period during the floating is an aerial phase, a period from the landing to the completion of the crouching is a posterior ground phase, a change in the height of a center of gravity with respect to time is a vertical pathway, and a change in a horizontal position of the center of gravity with respect to time is a horizontal pathway, the control method comprising:

a step of generating the vertical pathway of the prior ground phase, a step of computing the horizontal pathway of the prior ground phase, based upon the generated vertical pathway of the prior ground phase, a tridiagonal equation which is a discretization of a ZMP equation of the prior ground phase, a target ZMP of the prior ground phase, and horizontal speeds of the center of gravity at the beginning and the completion of the prior ground phase, a step of computing chronological data of target values of the joint angles of the prior ground phase, based upon the generated vertical pathway and the computed horizontal pathway of the prior ground phase, a step of generating the vertical pathway of the posterior ground phase, a step of computing the horizontal pathway of the posterior ground phase, based upon the generated vertical pathway of the posterior ground phase, a tridiagonal equation which is a discretization of a ZMP equation of the posterior ground phase, a target ZMP of the posterior ground phase, and horizontal speeds of the center of gravity at the beginning and the completion of the posterior ground phase, a step of computing chronological data of target values of the joint angles of the posterior ground phase, based upon the generated vertical pathway and the computed horizontal pathway of the posterior ground phase, and a step of rotating the joints based upon the computed chronological data of the target values of the joint angles.

6. The control method of the legged robot of claim 5, wherein each one of the steps of computing the horizontal pathway of the prior ground phase and the posterior ground phase comprises a step of solving simultaneous equations formed between a tridiagonal matrix having coefficients that are computed from the vertical pathway, and a horizontal pathway column and a distance column that is computed from the target ZMP and the horizontal speeds of the center of gravity at the beginning and the completion of the ground phase, to compute the horizontal pathway.

7. The control method of the legged robot of claim 5, wherein each one of the steps of generating the vertical pathway of the prior ground phase and the posterior ground phase polynomially interpolates between the vertical positions and speeds of the center of gravity at the beginning and the completion of the ground phases, to generate the vertical pathway.

8. A control method of a legged robot that moves a center of gravity in a vertical direction when one leg link is grounded by changing joint angles, the control method comprising:

a step of generating a vertical pathway of the center of gravity, a step of computing a horizontal pathway of the center of gravity, based upon the generated vertical pathway of the center of gravity, a tridiagonal equation which is a discretization of a ZMP equation, a target ZMP, and horizontal speeds of the center of gravity at the beginning and the completion of the vertical pathway, a step of computing chronological data of target values of joint angles, based upon the generated vertical pathway and the computed horizontal pathway of the center of gravity, and a step of rotating the joints based upon the computed chronological data of the target values of the joint angles.

* * * * *